(12) United States Patent
Barber et al.

(10) Patent No.: US 11,037,455 B1
(45) Date of Patent: Jun. 15, 2021

(54) AUTONOMOUS JUDGMENTAL OVERSTEERING DETERMINATION SYSTEM FOR AIRCRAFT TAXIING

(71) Applicant: Rockwell Collins, Inc., Cedar Rapids, IA (US)

(72) Inventors: Sarah Barber, Cedar Rapids, IA (US); Hannah C. Lehman, Austin, TX (US); Felix B. Turcios, Cedar Rapids, IA (US); Tiffany D. Williamson, Marion, IA (US); Bradley R. Thompson, Cedar Rapids, IA (US); Christopher Truong, Germantown, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 266 days.

(21) Appl. No.: 16/357,031

(22) Filed: Mar. 18, 2019

(51) Int. Cl.
  *G08G 5/06* (2006.01)
  *G05B 13/02* (2006.01)
  *G05D 1/02* (2020.01)

(52) U.S. Cl.
  CPC ......... *G08G 5/065* (2013.01); *G05B 13/0265* (2013.01); *G05D 1/0202* (2013.01)

(58) Field of Classification Search
  CPC .................................................. G08G 5/065
  See application file for complete search history.

(56) References Cited

U.S. PATENT DOCUMENTS

| | | | | |
|---|---|---|---|---|
| 8,478,642 B2* | 7/2013 | Dey | ................ | G08G 1/096844 705/14.4 |
| 8,855,919 B2* | 10/2014 | Tang | ................ | G01C 21/3697 701/410 |
| 2005/0004723 A1* | 1/2005 | Duggan | ................ | B64C 19/00 701/24 |
| 2007/0156294 A1* | 7/2007 | Tipping | ................ | G09B 23/06 701/1 |
| 2015/0279218 A1* | 10/2015 | Irrgang | ................ | G08G 5/0056 701/3 |
| 2015/0298817 A1* | 10/2015 | Jackson | ................ | G08G 5/065 701/3 |

(Continued)

OTHER PUBLICATIONS

Airbus SAS, Airbus A330 Airplane Characteristics for Airport Planning, Issue: Jan Jan. 1993, Rev: Jan Jan. 2012, 460 pages.

(Continued)

*Primary Examiner* — Alex C Dunn
(74) *Attorney, Agent, or Firm* — Suiter Swantz pc llo

(57) ABSTRACT

A method for oversteering an aircraft to perform an optimal turn along a taxiway includes determining a learning environment based on at least one of a taxiway width, a taxiway centerline, and a taxiway radius of curvature, selecting an action for an agent in the environment, determining a reward for the determined environment and the selected action, repeating the steps of selecting the action and determining the reward to determine a model supporting an optimal turn, and using the determined model to at least one of determine control signals for an aircraft and providing guidance to a user to perform the optimal turn along the taxiway. The agent is an aircraft having a minimum turn radius. The action includes a nose wheel displacement and a nose wheel angle. The reward is determined based on a distance between a path of one or more landing gear wheels and a path of the taxiway.

20 Claims, 21 Drawing Sheets

(56) References Cited

U.S. PATENT DOCUMENTS

| | | | | |
|---|---|---|---|---|
| 2019/0129934 | A1* | 5/2019 | Kadav | G06N 3/0445 |
| 2019/0235503 | A1* | 8/2019 | Minami | G05D 1/0202 |
| 2020/0027362 | A1* | 1/2020 | Dame | G05D 1/0202 |

OTHER PUBLICATIONS

Airbus, Airport and Maintenance Planning, printed Feb. 25, 2019 from Internet address https://www.airbus.com/aircraft/support-services/airport-operations-and-technical-data/aircraft-characteristics.html, 1 page.
Airports Council International, About ACI, printed Feb. 25, 2019 from Internet address http://www.aci.aero/media/75ef75ac-3ca3-4b10-8b69-dd8f9f346098/About, 3 pages.
Aviation Week, U.S. Airport Runway Incursions, printed on Feb. 22, 2019 at Internet address http://aviationweek.com/%5Bprimary-term%5D/us-runway-incursions-airlines-air-taxis, 2 pages.
Best, Jo, IBM Watson: The Inside Story of How The Jeopardy-Winning Supercomputer was Born, and What it Wants to do Next, printed Feb. 25, 2019 from Internet address https://www.techrepublic.com/article/ibm-watson-the-inside-story-of-how-the-jeopardy-winning-supercomputer-was-born-and-what-it-wants-to-do-next/, 12 pages.
Blake Shepard, Cycorp, Inc., printed on Feb. 22, 2019 from Internet address https://www.researchgate.net/profile/Blake_Shepard, 6 pages.
Boeing, 777-200/300 Airplane Characteristics for Airport Planning, Jul. 1998, 170 pages.
Boeing, 787 Airplane Characteristics for Airport Planning, Apr. 2006, 99 pages.
Boeing, 787 Airplane Characteristics for Airport Planning, Mar. 2018, 180 pages.
Boeing, Formal Distribution of the Boeing 747-6 Airport Compatibility Group Documentation, Nov. 29, 2010, 163 pages.
CiteSeerX, Rapid Object Detection Using a Boosted Cascade of Simple Features (2001), printed on Feb. 22, 2019 from Internet address http://citeseerx.ist.psu.edu/viewdoc/summary?doi=10.1.1.10.6807, 1 page.
CNBC, Southwest Plane Slides to Edge of Taxiway in Baltimore Airport; FAA Investigating, printed on Feb. 22, 2019 from Internet address https://www.cnbc.com/2018/02/07/southwest-plane-slides-to-edge-of-taxiway-in-baltimore-airport-faa-investigating.html, 4 pages.
Federal Aviation Administration, FAA Runway Safety Report, Runway Incursion Trends and Initiatives at Towered Airports in the United States, FY2000-FY2003, 124 pages.
Federal Aviation Administration, Runway Safety Statistics, printed on Feb. 22, 2019 from Internet address https://www.faa.gov/airports/runway_safety/statistics/, 2 pages.
Federal Aviation Administration, Runway Safety, Runway Incursions, printed on Feb. 22, 2019 from Internet address https://www.faa.gov/airports/runway_safety/news/runway_incusions/, 3 pages.
Full Transcript: Sundar Pichai at Google I/O 2018 Developer Conference, printed Feb. 25, 2019 from Internet address https://singjupost.com/full-transcript-sundar-pichai-at-google-i-o-2018-developer-conference/?singlepage=1, 49 pages.
IATA, Current Airline Members, printed on Feb. 22, 2019 from Internet address https://www.iata.org/about/members/Pages/airline-list.aspx, 2 pages.
IATA, Safety Report 2017, Issued Apr. 2018, 248 pages.
International Civil Aviation Organization, About ICAO, printed on Feb. 22, 2019 from Internet address https://www.icao.int/about-icao, 1 page.
Introduction to the Q-Learning Algorithm, printed on Feb. 22, 2019 from Internet address http://mnemstudio.org/path-finding-q-learning.htm, 1 page.
Order of the Minister of Justice of Oct. 4, 2010 for inclusion in the Official Gazette of the text of the Decree on the Supervision of Civil Aviation BES, as amended by the Adjustment Decree on public bodies Bonaire, St. Eustatius and Saba, printed on Feb. 25, 2019 from Internet address https://zoek.officielebekendmakingen.nl/stb-2010-632.html?zoekcriteria=%3Fzkt%3DUitgebreid%26pst%3DStaatsblad%26vrt%3D104%26zkd%3DInDeGeheleText%26dpr%3DAlle%26sdt%3DDatumUitgifte%26%20pnr%3D2%26rpp%3D10%26.
Patacciola, Massimiliano, Dissecting Reinforcement Learning—Part. 6, Aug. 14, 2017, printed on Feb. 22, 2019 from Internet address https://mpatacchiola.github.io/blog/2017/08/14/dissecting-reinforcement-learning-6.html, 45 pages.
Pointers, Pass by Value and Pass by Reference (and Reference Variables), printed on Feb. 22, 2019 from Internet address http://www.sstutor.com/cpp/pointer2a.htm, 6 pages.
Skybrary Aviation Safety, Airplane Design Group (ADG), printed on Feb. 22, 2019 from Internet address https://www.skybrary.aero/index.php/Airplane_Design_Group_(ADG), 3 pages.
Skybrary Aviation Safety, ICAO Aerodrome Reference Code, printed on Feb. 22, 2019 from Internet address https://www.skybrary.aero/index.php/ICAO_Aerodrome_Reference_Code, 5 pages.
Stroustrup, Bjarne, Programming Principles and Practice Using C , Second Edition, copyright 2014 Pearson Education, Inc., 137 pages.

* cited by examiner

702

704

706

1700

AUTONOMOUS JUDGMENTAL OVERSTEERING DETERMINATION SYSTEM FOR AIRCRAFT TAXIING

BACKGROUND

The present disclosure relates to avionics. More specifically, the present disclosure relates to the taxiing process of an aircraft.

When an aircraft lands at an airport, it taxis along various taxiways to arrive at a destination where cargo and occupants may board. In some cases, the taxiway may be narrow and large aircraft must oversteer to maintain all landing gear wheels on the taxiway. The amount of oversteer is largely based on the pilot's judgment. In some cases, especially with very narrow taxiways and large aircraft, it can be difficult for the pilot to determine an appropriate amount of oversteer.

SUMMARY

In one aspect, the inventive concepts disclosed herein are directed to an oversteer system for an aircraft. In some embodiments, the system includes a controller configured to determine an optimal turn along a taxiway. In some embodiments, the controller is configured to receive information regarding at least one of an airport, an aircraft, and a turn environment, determine a learning environment based on any of the received information, perform a reinforcement learning algorithm using the determined learning environment to determine a model which predicts an optimal turn path, and output the model as at least one of a table and an equation. In some embodiments, the system includes an aircraft controller configured to receive at least one of the table and the equation from the controller, input path-specific information to at least one of the table and the equation, determine an optimal turn path for the aircraft, and at least one of provide guidance to a user to complete the optimal turn along the taxiway and generate a control signal to cause the aircraft to perform the optimal turn.

In some embodiments, the controller is configured to receive information regarding at least one of the airport, the aircraft, and the turn environment from a database.

In some embodiments, the reinforcement learning algorithm includes a Q-Learning technique.

In some embodiments, at least one of the controller and the aircraft controller is configured to determine at least one of a center, a radius, a start point, and an end point of the turn.

In some embodiments, the aircraft controller is configured to receive an airport map from an airport database to determine at least one of the center, the radius, the start point, and the end point of the turn.

In some embodiments, the aircraft controller is configured to use at least one of the table and the equation to determine a nose wheel angle and a nose wheel displacement to complete the optimal turn based on at least one of a turn radius, a taxiway width, and an angle of turn of the taxiway.

In some embodiments, the controller is configured to determine at least one distance between a centerline of the taxiway and at least one of a front landing gear and a rear landing gear for a selected action.

In some embodiments, the controller is configured to determine a reward for the selected action based on the at least one distance.

In some embodiments, the aircraft controller is configured to provide a nose wheel angle and a nose wheel displacement to the user to perform the optimal turn.

In some embodiments, the aircraft controller is configured to provide the nose wheel angle and nose wheel displacement to the user through a user interface. In some embodiments, the user interface includes a nose wheel angle indicator and a nose wheel displacement indicator.

In some embodiments, the controller is configured to receive at least one of airport, aircraft and turn environment information, determine the learning environment, and perform the reinforcement learning algorithm remotely and provide the model to the aircraft controller remotely.

In some embodiments, the controller is configured to receive information from at least one sensor of the aircraft to perform the reinforcement learning based on the information from the at least one sensor of the aircraft.

In a further aspect, embodiments of the inventive concepts disclosed herein are directed to a method for oversteering an aircraft to perform an optimal turn along a taxiway. In some embodiments, the method includes determining a learning environment based on at least one of a taxiway width, a taxiway centerline, and a taxiway radius of curvature, selecting an action for an agent in the environment, determining a reward for the determined environment and the selected action, repeating the steps of selecting the action and determining the reward to determine a model supporting an optimal turn, and using the determined model to at least one of determine control signals for an aircraft and providing guidance to a user to perform the optimal turn along the taxiway. In some embodiments, the agent is an aircraft having a minimum turn radius. In some embodiments, the action includes a nose wheel displacement and a nose wheel angle. In some embodiments, the reward is determined based on a distance between a path of one or more landing gear wheels and a centerline path of the taxiway.

In some embodiments, the method further includes receiving airport data from an airport database, determining a turn angle of one or more turns of a route, determining a turn radius of the one or more turns of the route, and determining a start and end point of the one or more turns of the route.

In some embodiments, the method includes outputting the determined model as at least one of a table and an equation.

In some embodiments, the method includes using at least one of the table and the equation to determine a nose wheel angle and a nose wheel displacement based on at least one of a radius of curvature of a turn, a taxiway width, and an overall turn angle of the taxiway.

In some embodiments, the method includes providing the nose wheel angle and the nose wheel displacement to the user.

In some embodiments, the method includes determining at least one of an average reward per episode and a median reward per episode based on the determined reward.

In some embodiments, the method includes using a Q-Learning technique to determine the model based on the determined learning environment and the agent.

In some embodiments, the determined reward is inversely proportional to the distance between the path of the one or more landing gear wheels and the centerline path of the taxiway.

In still further aspects, embodiments, of the inventive concepts disclosed herein are directed to a method for determining a taxiway path of an aircraft. In some embodiments, the method includes determining a learning environment comprising a taxiway curve, a taxiway width, a taxiway centerline, and a coordinate system. In some embodiments, the method includes selecting an action from a Q-Learning matrix for an agent. In some embodiments, the agent is an aircraft having a nose wheel and one or more rear wheels and the action includes a nose wheel angle and a nose wheel displacement. In some embodiments, the nose wheel displacement is a distance between the nose wheel and a start of the taxiway curve. In some embodiments, the method includes determining a reward based on the selected action for the agent and the learning environment. In some embodiments, the reward is a value based on a distance between the taxiway centerline and at least one of the nose wheel and the rear wheels. In some embodiments, the method includes updating the Q-Learning matrix with the selected action and the determined reward, generating at least one of a table and an equation which outputs a specific nose wheel angle and a specific nose wheel displacement for a specific taxiway in response to receiving taxiway turn parameters of the specific taxiway, and at least one of controlling an operation of a nose wheel of the aircraft to turn the specific nose wheel angle at the specific nose wheel displacement, and outputting guidance information to a user interface, wherein the guidance information comprises the specific nose wheel angle and the specific nose wheel displacement.

DETAILED DESCRIPTION

Overview

Figure 1:
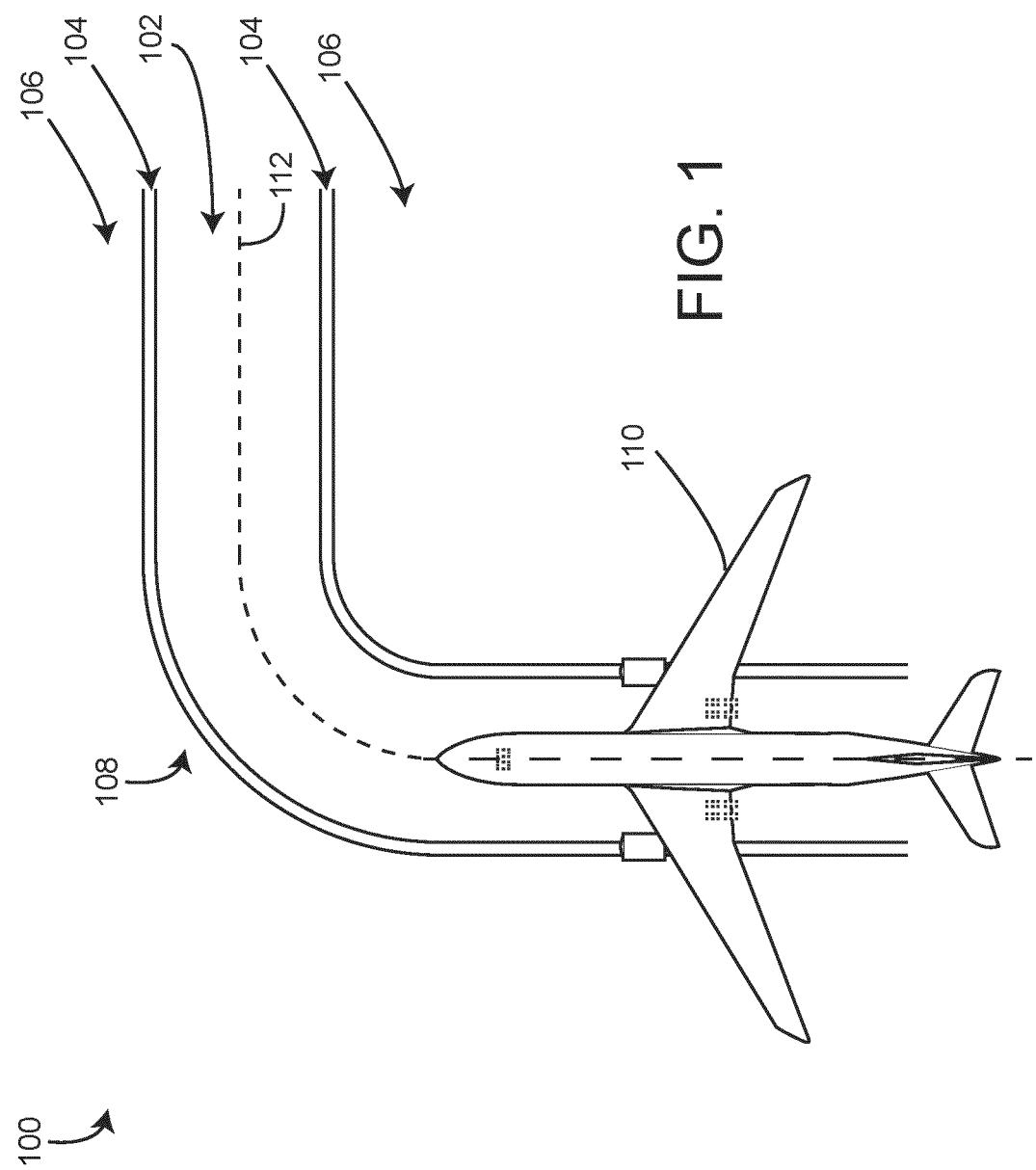
FIG. 1 is a drawing of an aircraft on a taxiway, according to some embodiments.

The present disclosure relates to an application of machine learning (ML) to taxiing operations for an aircraft between landing and arriving at a gate and/or between a gate and a departure runway, according to some embodiments.

Taxiing Process

In some embodiments, the taxiing process is considered to have started once the aircraft has landed and continues until the aircraft arrives at a parking location and aircraft engines are shut down. This process has various steps, described in greater detail hereinbelow, according to some embodiments. In some embodiments, the taxiing process begins once the aircraft has landed and stopped, although not necessarily after exiting the runway. Once the aircraft has landed, a pilot of the aircraft is responsible for most taxiing controls while a first officer of the aircraft is typically responsible for communications, according to some embodiments. The first procedure is to exit the runway onto a taxiway and contact ground control (e.g. a control tower) for taxi instructions, according to some embodiments. At this point, the first officer begins an after landing checklist and changes the aircraft configuration to that required or desired for taxiing (e.g., switching over to an APU), according to some embodiments. Once the pilot receives instructions from the control tower, the pilot taxis via a route dictated by ground control, switching communications to ramp control when/if necessary, according to some embodiments. The pilot must then park the aircraft, utilizing marshallers, wing walkers, and any other resources provided by the airport, according to some embodiments. After parking, crew perform an engine shut down checklist and select parking brakes off once the wheel chocks have been installed. After the aircraft is safely parked and powered down, a disembarkation process begins, according to some embodiments. At this point, authority is relinquished to the ground crew, according to some embodiments.

Throughout the taxiing process steps there are a number of actions that must constantly be taken into account, according to some embodiments. In some embodiments, communication is a constant challenge throughout the taxiing process. First and foremost, pilots and officers must serve as an intermediary between their company and tower control. Company officials determine the gate number, but do not communicate directly with air traffic control (ATC), according to some embodiments. It therefore becomes the responsibility of the pilot to relay gate information to the company officials and to reconcile any difference between company and ATC plans, according to some embodiments. The pilot must also operate the aircraft to taxi with constant situational awareness, according to some embodiments. Pilots must be constantly aware of obstacles, landing gear locations, the aircraft's location on the taxiway, ATC instructions, etc., according to some embodiments.

Judgmental Oversteering

Judgmental oversteering is typically determined by the pilot operating the aircraft, according to some embodiments. When large aircraft steer around turns, it becomes necessary to steer nose landing gear off a centerline of the taxiway in order to keep main or wing landing gear on a paved portion of the taxiway, according to some embodiments. This is similar to how a large truck navigates turns, especially right-hand turns, according to some embodiments. The oversteering can become so pronounced in larger aircraft that the pilot will oversteer such that a cockpit of the aircraft is over grass, according to some embodiments. In many cases, the oversteering is judgmental, according to some embodiments. In this way, little optimization work has been done to find a best path for the nose landing gear, and correct oversteering is usually a result of the pilot's judgement, according to some embodiments. Advantageously, the ML algorithm of the present disclosure can be used for optimization of oversteering, according to some embodiments. The ML algorithm of the present disclosure is based purely on the environment and an assigned priority, according to some embodiments. This means that the ML algorithm agent does not require a large amount of data, according to some embodiments. The ML algorithm uses reinforcement learning, according to some embodiments.

Implementation Theory

Machine Learning

ML is a special method of data analysis which automates analytical model building, according to some embodiments. It is a branch of computer science and artificial intelligence that has had entire courses dedicated to it and can be regarded as a whole field on its own, according to some embodiments. There are a variety of algorithms and techniques which may be used to solve many data challenges in a wide variety of fields and industries including the Aviation industry, according to some embodiments. Within Avionics, ML utilizes data to create systems that learn from data, perform pattern recognition, and make optimal decisions with little human intervention, according to some embodiments. The benefits in the long term implementations of machine learning can include improved oversteering performance, and more efficient operations on the runway, according to some embodiments.

Artificial Neural Networks (ANN) are computing systems modeled after and inspired by synapses in a human brain, according to some embodiments. The artificial nature of ANN allows them to be modified and optimized in order to perform certain tasks, according to some embodiments. One limitation to ANN is that the certain tasks must be something that people can already perform, according to some embodiments. Once the ANN has been trained, the ANN may be able to perform the tasks faster and with higher accuracy than a human could, but the tasks the ANN may perform are limited by data provided to the ANN, according to some embodiments.

Q-Learning

Q-Learning is a ML technique used in Reinforcement Learning (RL) that is used for the ML algorithm to perform oversteering, according to some embodiments. Through this process, an agent attempts to learn an optimal policy through its history of experience in interactions with its given environment, according to some embodiments. Q-Learning is also a metric for measuring the best action an agent can take through comparisons of possible states and outcomes that can result from each action, according to some embodiments.

Assumptions

To optimize oversteering with a ML agent, many possible conditions may be considered, according to some embodiments. Additionally, many factors may be considered, according to some embodiments. In order to determine a solution capable of being run with little processing power, yet still achieve an accurate representation of the environment, assumptions and considerations are made, according to some embodiments. These assumptions do not infringe on the validity of the solution, but improve processing performance, according to some embodiments.

A first assumption is instantaneous tiller change, according to some embodiments. When pilots steer an aircraft to perform a turn, the tiller is typically turned relatively quickly and held at an appropriate angle until the turn is completed, according to some embodiments. It is assumed that the tiller turn is instantaneous, since the tiller turn is so quick with respect to the full turn and length of time it takes to complete the full turn, that an amount of time to perform the tiller term is negligible, according to some embodiments.

A second assumption is speed of turn, according to some embodiments. The generally accepted taxi speed is approximately 15-20 knots, with turns being less than 10 knots (often approximately 5 knots for very sharp turns), according to some embodiments. It is assumed that the speed of turn is so slow that the speed is not a substantial factor in turn characteristics. For example, slippage may be neglected since the turn speed is so slow that slippage does not occur, according to some embodiments.

A third assumption is a steering assumption, according to some embodiments. The steering assumption assumes symmetric thrust and no differential braking, according to some embodiments. Differential braking and thrusting is not easily integrated into the environment, due to the high number of affecting factors which may be difficult to account for, according to some embodiments. To make the ML more feasible, and to focus on more favorable choices, differential steering and asymmetric thrust are neglected, according to some embodiments. Furthermore, differential braking is undesirable since it can put undue stress and torque on wheel attachments, according to some embodiments.

A fourth assumption is a taxiway width assumption, according to some embodiments. The taxiway width assumption does not assume that the entire taxiway is of an equal width, but rather that the environment is built such that the agent steers the aircraft around a corner without a fillet, according to some embodiments. The environment still focuses on following a best path, so this assumption does not, therefore, hinder the performance of the determined best path, according to some embodiments. Furthermore, the fillet may be difficult to map, as fillets may not follow a standard form, much less a standard size, according to some embodiments.

A fifth assumption is a wheel position assumption, according to some embodiments. The wheel position assumption assumes that positions of the wheels are known, according to some embodiments. For example, the agent may receive the positions of the wheels from a database, according to some embodiments. In some embodiments, the wheel position assumption disconnects a method of identifying the positions of the wheels from the agent. In this way, the method of identifying the positions of the wheels may be updated and modified to improve the method, without being dependent on the agent, according to some embodiments. Advantageously, the separation of the agent from a lower level method such as determining the position of the wheels keeps the agent independent and versatile, according to some embodiments. The information regarding the position of the wheels may come from a number of overlapping sources, according to some embodiments. In some embodiments, the information regarding the position of the wheels comes from one or more sensors. The agent assumes that, at some point prior to implementing the agent, the exact (or substantially exact, or approximate) location and orientation of the aircraft is known, according to some embodiments. This knowledge is integral to the performance of the agent, but is not an integrated part of the ML itself, according to some embodiments. In some embodiments, the wheel position (e.g., therein determining position and orientation of the aircraft) uses Global Positioning (GPS) techniques, inertial tracking, computer vision, or any other technology and combination thereof.

Validation and Verification

ML uses various metrics for validation and verification, according to some embodiments. In RL, validation deals with the environment which the agent trains on, according to some embodiments. If the environment can be proven to be representative of the real world, the environment can be validated, according to some embodiments. If the agent can be proven to be making accurate/good decisions, the agent can be verified, and the RL system as a whole is considered both validated and verified, according to some embodiments.

The environment discussed in greater detail below is based on geometric principles, according to some embodiments. However, this means that, given the assumptions discussed previously, the model is validated by definition, as properly performed geometry is by definition validated, according to some embodiments.

One way to verify an agent is to examine reward per episode, according to some embodiments. This verification method may be used for Q-Learning and/or any other State-Action-Reward-State-Action (SARSA) algorithm, according to some embodiments. Reward per episode verification examines an average reward an agent gains per episode of training, according to some embodiments. As the agent learns, this reward per episode should increase, according to some embodiments. The agent uses an average reward per episode, because, as the agent trains, the agent still takes risks to avoid over-greedy behavior and continue exploring alternative option, according to some embodiments. Since the agent is still examining alternative options, failed episodes are still expected, according to some embodiments. However, as long as a trend of the average reward per episode is increasing, the agent is considered to be improving, according to some embodiments. To verify the agent, a trendline of the average reward per episode must pass a metric, according to some embodiments. In some embodiments, the metric is between 0.8 and 0.97 on a graph with the reward normalized to a [0,1] range.

Learning Environment

Overview

Referring now to FIG. 1, a representation of a learning environment 100 is shown, according to some embodiments. RL requires understanding of the environment and an ability to create a representative form thereof, according to some embodiments. For the purposes of this optimization problem, the environment is defined by turning characteristics of various aircraft (discussed in greater detail below). The learning environment 100 shown in FIG. 1 may be presented to an agent as a series of state space dimensions whose variation changes the optimization problem, according to some embodiments. FIG. 1 is shown to include an aircraft 110, according to some embodiments. Aircraft 110 is shown making a turn along a taxiway 108, according to some embodiments. Taxiway 108 is shown to include a taxiway path/centerline, shown as centerline 112, according to some embodiments. As aircraft 110 makes the turn along taxiway 108, aircraft 110 may be required to perform an oversteering operation to maintain all wheels on taxiway 108, according to some embodiments. Taxiway 108 is also shown to include a paved portion 102, according to some embodiments. In some embodiments, taxiway 108 also includes caution portions 104, extending alongside paved portion 102. Caution portions 104 may have a predetermined width according to some embodiments. In some embodiments, caution portions 104 are also paved, and/or are a part of paved portion 102. In some embodiments, taxiway 108 is surrounded by an off-taxiway portion, shown as portion 106. Portion 106 may be any of dirt, grass, pavement, or any other surface defined as being outside of taxiway 108, according to some embodiments. The agent learns how to steer aircraft 110 such that the wheels of aircraft 110 remain as close to centerline 112 of taxiway 108 as possible, according to some embodiments. In some embodiments, the agent controls aircraft 110 to avoid extremum areas (e.g., caution portions 104) since the pavement may be uneven in these areas. In some embodiments, the agent controls aircraft 110 to steer such that the wheels go on extremum areas (e.g., caution portion 104) if the only other option is to steer such that the wheels go off taxiway 108. The learning environment is described in greater detail below, according to some embodiments.

Geometric Theory

Figure 2:
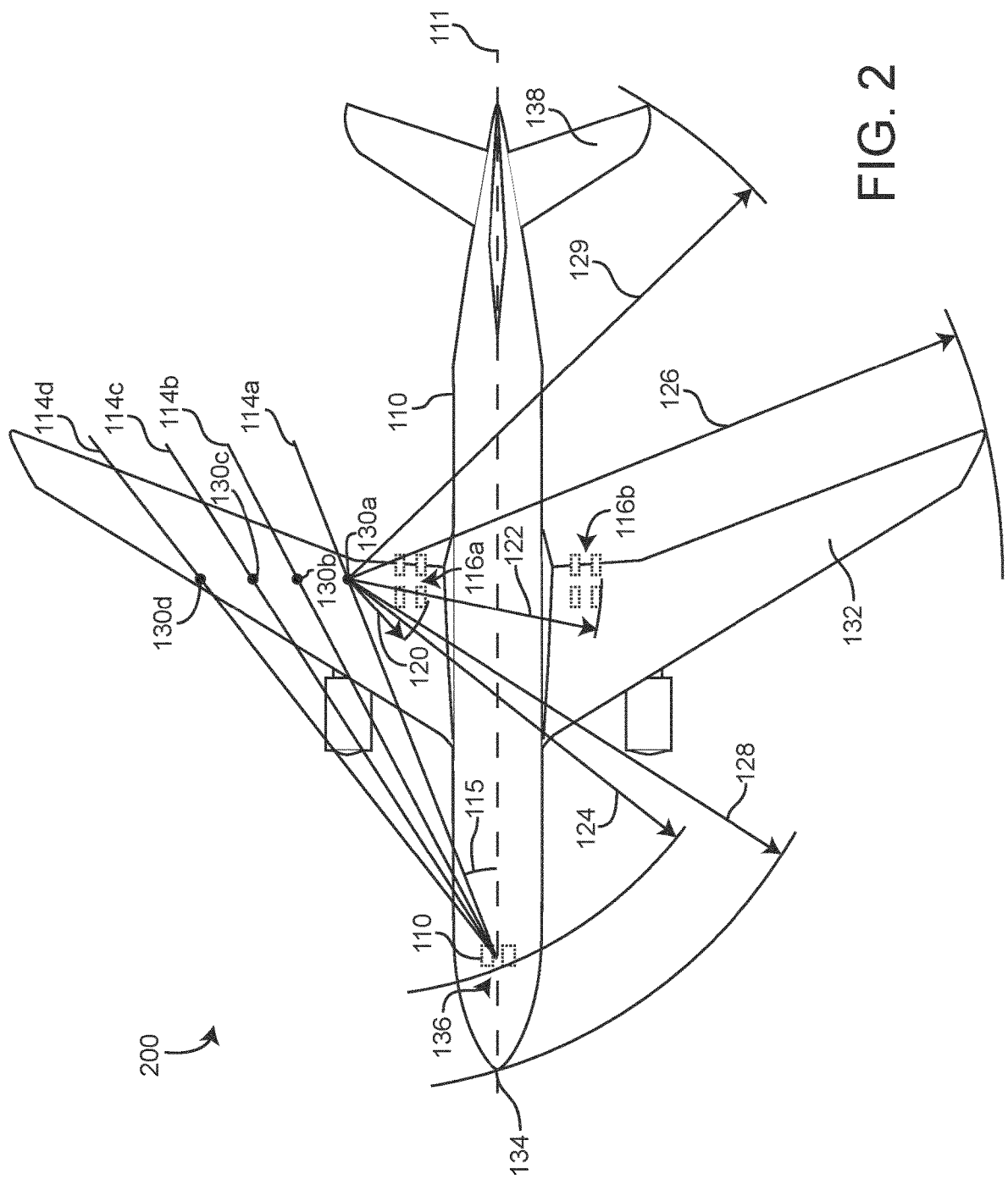
FIG. 2 is a drawing of various turn radii of an aircraft, according to some embodiments.

As discussed above, a primary component of RL is the environment, according to some embodiments. The environment can either be developed empirically through data using a process called inverse-RL, or it can be developed through laws and rules, according to some embodiments. For the agent of the present disclosure, the environment is developed based on known properties (e.g., geometric properties, operational characteristics, etc.) of aircraft, according to some embodiments. Referring to FIG. 2, a typical diagram 200 is shown, depicting various turn radii of aircraft 110, according to some embodiments. Diagram 200 is shown to include lines 114a-d, according to some embodiments. Lines 114a-d represent various tiller positions, according to some embodiments. Each of lines 114a-d include an angle 115 relative to a centerline 111 of aircraft 110, according to some embodiments. For example, line 114a corresponds to a turn angle of 72 degrees, and has angle 115 equaling a first value, according to some embodiments. Likewise, line 114b corresponds to a turn angle of 65 degrees, line 114c corresponds to a turn angle of 60 degrees, and line 114c corresponds to a turn angle of 55 degrees, according to some embodiments. Each tiller position is also shown to include a different center of rotation 130, according to some embodiments. For example, each of the four tiller positions shown (and consequently the four turn angles and described hereinabove with reference to lines 114a-d) correspond to a different center of rotation 130. The tiller position resulting in a turn angle of 72 degrees (e.g., line 114a) has center of rotation 130a, according to some embodiments. The tiller position resulting in a turn angle of 65 degrees (e.g., line 114b) has center of rotation 130b, according to some embodiments. The tiller position resulting in a turn angle of 60 degrees (e.g., line 114c) has center of rotation 130c, according to some embodiments. The tiller position resulting in a turn angle of 55 degrees (e.g., line 114d) has center of rotation 130d, according to some embodiments. Each of center of rotation 130a-d are located perpendicularly outward from rear landing gear 116, according to some embodiments.

Referring still to FIG. 2, each center of rotation 130 is shown to have corresponding radii, according to some embodiments. For example, center of rotation 130 defines radii 120-129, according to some embodiments. Radius 120 is defined as a distance between center of rotation 130 (e.g., center of rotation 130a as shown in FIG. 2), and rear landing gear 116a, according to some embodiments. Radius 122 is defined as a distance between center of rotation 130 (e.g., center of rotation 130a as shown in FIG. 2) and rear landing gear 116b, according to some embodiments. Radius 124 is defined as a distance between center of rotation 130 (e.g., center of rotation 130a as shown in FIG. 2) and front landing gear 136, according to some embodiments. Radius 126 is defined as a distance between center of rotation 130 (e.g., center of rotation 130a as shown in FIG. 2) and an outermost tip of wing 132, according to some embodiments. Radius 128 is defined as a distance between center of rotation 130 (e.g., center of rotation 130a as shown in FIG. 2) and a nose 134 of aircraft 110, according to some embodiments. Radius 129 is defined as a distance between center of rotation 130 (e.g., center of rotation 130a as shown in FIG. 2) and a tip of rear stabilizer 138, according to some embodiments.

Referring still to FIG. 2, as turn radius decreases (e.g., angle 115 increases), radii 120-129 increase, according to some embodiments. For example, if the turn angle as determined by the tiller position is zero, radii 120-129 are infinity. In some embodiments, radii 120-129 are referred to as turning radii. The turning radii may be determined empirically and/or may be provided to the agent from a manual (e.g., a manual produced by a manufacturer of the aircraft). The turning radii are taken with symmetric thrust and no differential braking, according to some embodiments, as described in greater detail above.

Figure 3:
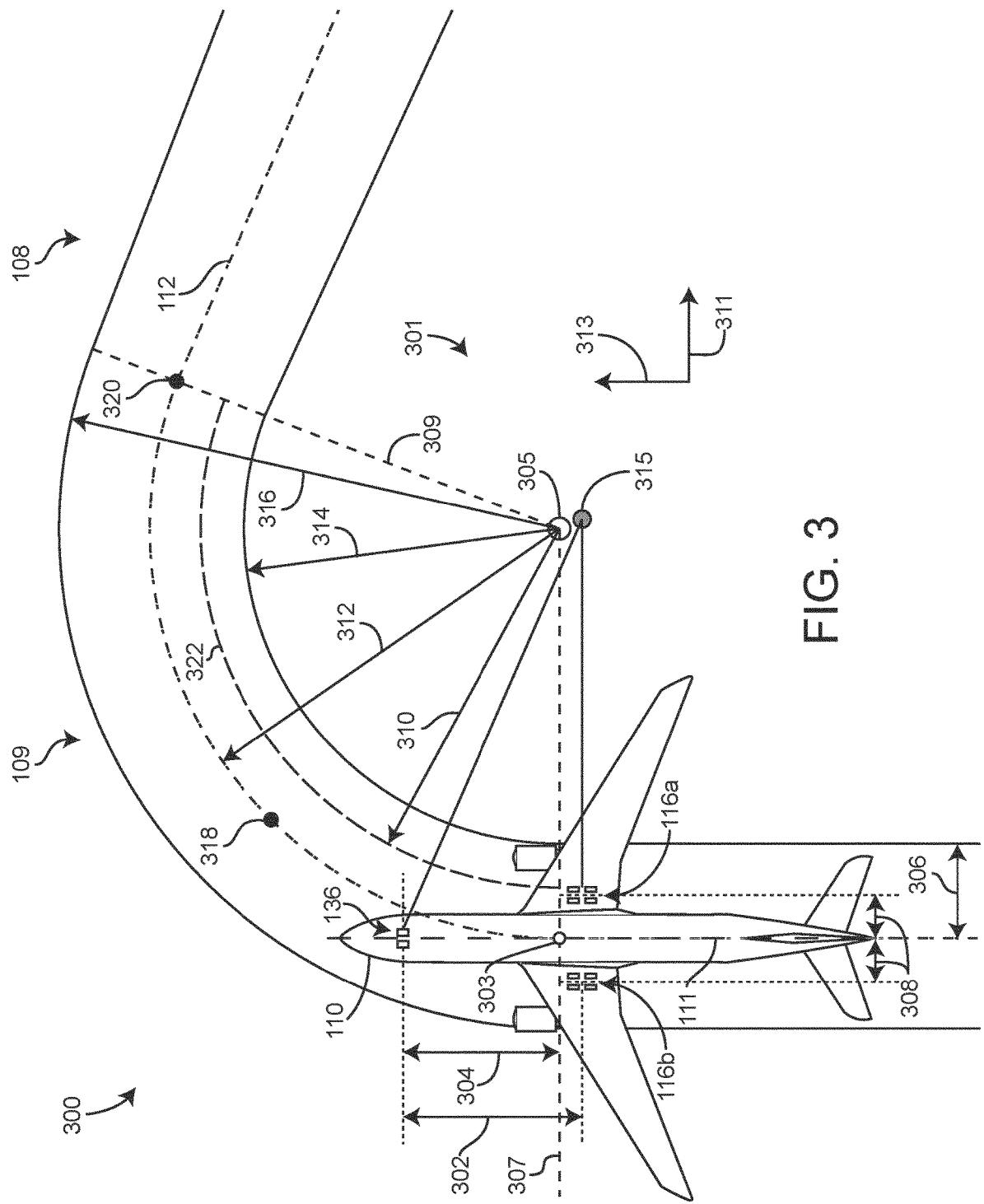
FIG. 3 is a coordinate system of an aircraft and a taxiway, according to some embodiments.

Referring now to FIG. 3, a diagram of an environment 300 having a coordinate system 301 is shown, according to some embodiments. Environment 300 is shown to include aircraft 110 and taxiway 108 having centerline 112, according to some embodiments. Coordinate system 301 as described herein below is applied to any environment similar to environment 300 as shown in FIG. 3, according to some embodiments.

Referring still to FIG. 3, coordinate system 301 is shown to define various radii of taxiway 108, and various dimensions of aircraft 110, according to some embodiments. Coordinate system 301 has an origin, shown as origin 303, a horizontal direction, shown as x-axis 311, and a vertical direction, shown as y-axis 313, according to some embodiments. Taxiway 108 includes a curved portion, shown as curve 109, according to some embodiments. Curve 109 is shown to have a radius 312 and a center of curvature 305, according to some embodiments. In some embodiments, curve 109 begins at a first centerline, shown as centerline 307 and ends at a second centerline, shown as centerline 309. The radius 312 of curve 109 of taxiway 108 is referred to as variable $r_T$, according to some embodiments. Taxiway 108 has a width, shown as width 306, according to some embodiments. In some embodiments, width 306 is referred to as variable w. Using variable $r_T$ (i.e., radius 312) and variable w (i.e., width 306), an outer radius 316 and an inner radius 314 of curve 109 of taxiway are mathematically defined, according to some embodiments. Outer radius 316 is mathematically defined as $r_T+w$, according to some embodiments. Inner radius 314 is mathematically defined as $r_T-w$, according to some embodiments. Coordinate system 301 has an origin, shown as origin 303, according to some embodiments. Origin 303 lies on centerline 112 of taxiway 108 and on centerline 307, according to some embodiments. In this way, center of curvature 305 is positioned at x-axis 311 and y-axis 313 coordinates ($r_T$, 0), relative to origin 303, according to some embodiments. Aircraft 110 has a distance 302 between an axis extending perpendicularly through front landing gear 136 and an axis extending perpendicularly through rear landing gear 116, according to some embodiments. In some embodiments, distance 302 is the distance longitudinally from front landing gear 136 to rear landing gear 116b. In some embodiments, distance 302 is referred to as variable X. Aircraft 110, front landing gear 136, and centerline 307 define a distance 304, according to some embodiments. In some embodiments, distance 304 is a tangential distance of front landing gear 136 and centerline 307 (e.g., the start of curve 109). Distance 304 is referred to as variable $t_d$, according to some embodiments. Each of rear landing gear 116a and rear landing gear 116b are shown positioned a distance 308 relative to centerline 111 of aircraft 110, according to some embodiments. In some embodiments, distance 308 is referred to as variable $w_w$.

From variable $t_d$ (i.e., distance 304), variable X (i.e., distance 302), and variable $w_w$ (i.e., distance 308), coordinate positions of each of rear landing gear 116a and rear landing gear 116b are determined, according to some embodiments. The coordinate positions (relative to origin 303 and x-axis 311/y-axis 313) of rear landing gear 116a and rear landing gear 116b are ($-w_w$, $t_d-X$), and ($w_w$, $t_d-X$), respectively, according to some embodiments. In the configuration shown in FIG. 3, front landing gear 136 has coordinate position (0, $t_d$), according to some embodiments.

From the coordinate system 301 described hereinabove, a coordinate position of arbitrary point 318 which lies on centerline 112 of curve 109 of taxiway 108 can be determined, according to some embodiments. In some embodiments, point 318 has coordinate position (($r_T(1-\cos(\theta))$), $r_T(\sin(\theta))$), relative to origin 303, with θ being an angle formed between centerline 307 and an axis extending radially outwards from center of curvature 305 intersecting point 318. For example, when θ=0, point 318 has coordinate position ($r_T$, $r_T$) relative to origin 303, according to some embodiments. In some embodiments, point 318 has coordinate positions ($r_T-r_T(1-\cos(\theta))$, $r_T(\sin(\theta))$) or ($r_T \cos(\theta)$, $r_T \sin(\theta)$), relative to center of curvature 305, with θ being an angle formed between centerline 307 and an axis extending radially outwards from center of curvature 305 intersecting point 318.

Point 320 is shown lying on centerline 112 and centerline 309, according to some embodiments. In some embodiments, point 320 indicates an end of curve 109. In some embodiments, point 320 has coordinate position ($r_T(1-\cos(\theta))$, $r_T(\sin(\theta))$), relative to origin 303, where θ is an angle formed between centerline 307 and centerline 309. Any point along centerline 112 of curve 109 may be determined to have a coordinate position expressed by the same equations as for point 320, with θ being an angle unique to the point, according to some embodiments.

As aircraft 110 turns along curve 109 of taxiway 108, aircraft 110 has center of rotation 315, according to some embodiments. As aircraft 110 turns along curve 109 of taxiway 108, inner landing gear (i.e., rear landing gear 116a) defines path 322, according to some embodiments. Path 322 is shown having a radius of curvature 310, according to some embodiments. Radius of curvature 310 is the radius of curvature of rear landing gear 116a on the inside of turn 109, according to some embodiments. In some embodiments, radius of curvature 310 is referred to as variable $r_{i,w}$. A coordinate position of center of rotation 315 is determined using the coordinate position of rear landing gear 116a, front landing gear 136, and variable $r_{i,w}$ (radius of curvature 310), according to some embodiments. In some embodiments, the coordinate position of center of rotation 315 is ($w_w + r_{i,w}$, $t_d - X$), relative to origin 303.

Figure 4:
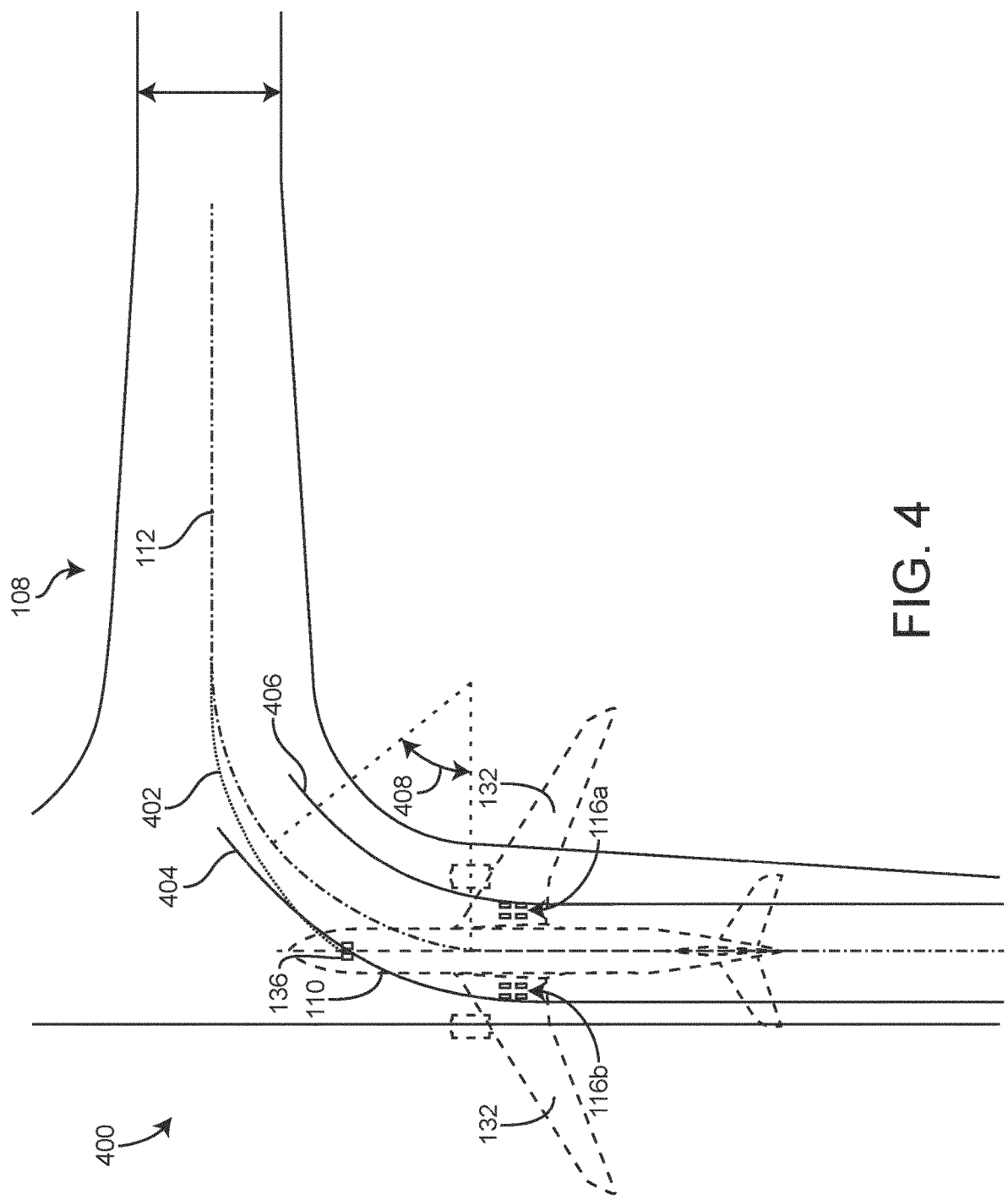
FIG. 4 is a drawing of various paths of an aircraft as the aircraft performs a turn along a taxiway, according to some embodiments.

Referring now to FIG. 4, a diagram illustrating various paths of various components of aircraft 110 is shown, according to some embodiments. FIG. 4 is shown to include centerline 112, which visualizes a path of a centerline of taxiway 108, according to some embodiments. A curved portion of centerline 112 may be represented by parametric equations which represent a portion of a circle, according to some embodiments. The curved portion of centerline 112 may be defined by a centerline equation defined as: $centerline_{path} = \{x = r_T(1 + \cos(180 - \theta_{CL})); \quad y = r_T(1 - \sin(180 - \theta_{CL}))\}$, according to some embodiments. In the centerline equation shown above, $\theta_{CL}$ exists in a range $0 < \theta_{CL} < 0$, according to some embodiments. The circle in this case starts at (0,0), and progresses counterclockwise with successively larger angles, according to some embodiments. Because of this, the centerline equation must be defined as $180 - \theta_{CL}$ with an initial x-axis shift of $r_T$, according to some embodiments. Therefore, by similar geometric principles, the conditions of the centerline equation at the end of the circle (e.g., the end of the turn) may be defined as: curve end point = $\{r_T(1 - \cos(\theta_{CL})), r_T \sin(\theta_{CL})\}$ and centerline slope at endpoint = $\tan(90 - \theta_{CL})$, according to some embodiments. From these conditions, an overall centerline path equation can be described as:

$$y = \tan(90 - \theta)(x - r_T(1 - \cos(\theta))) + r_T \sin(\theta) \text{ where } x > r_T(1 - \cos(\theta))$$

according to some embodiments.

Referring still to FIG. 4, front landing gear 136 is shown to produce nose path 402 as aircraft 110 turns along taxiway 108, according to some embodiments. The nose path may be defined as:

$$nose_{path} = \begin{cases} x = r_n(\cos(180 - \theta_{nose}) - \cos(180 - \theta_{nose,initial})) \\ y = r_n(\sin(180 - \theta_{nose}) - \sin(180 - \theta_{nose,initial})) + t_d \end{cases}$$

according to some embodiments. The nose path equation defined above is defined using $180 - \theta_{nose}$ because this turn is defined for simulation as starting on a leftmost side and progressing counterclockwise, according to some embodiments. $\theta_{nose}$ is similar to $\theta_{CL}$, according to some embodiments, however $\theta_{nose}$ is measured from a current position of front landing gear 136 rather than centerline 112. $\theta_{nose}$ is a range of angles defined as a tan $$\left(\frac{X}{w_w + r_{i,w}}\right) \leq \theta_{nose} \leq 360,$$

according to some embodiments. $\theta_{nose}$ spans the range of angles specified because a position of a center of rotation of aircraft 110 is defined as being radially outward from rear landing gear 116, according to some embodiments. Therefore, $$\theta_{nose,initial} = \text{atan}\left(\frac{X}{w_w + r_{i,w}}\right),$$

according to some embodiments. This relationship is described in greater detail below with reference to FIG. 5, according to some embodiments.

Referring still to FIG. 4, aircraft 110 is shown to include rear landing gear 116, according to some embodiments. In some embodiments, rear landing gear 116a and rear landing gear 116b produce paths 406 and 404 as aircraft 110 turns along taxiway 108, respectively. In the example shown in FIG. 4, rear landing gear 116a is closer to a center of the turn of taxiway 108, and is therefore referred to as inner landing gear, according to some embodiments. Path equations for the inner rear landing gear (e.g., landing gear 116a) may be determined using similar geometric/logical progressions as described above, according to some embodiments. Following the similar geometric/logical progressions as described above, an inner wheel path equation can be determined as:

$$innerwheel_{path} = \begin{cases} x = r_{i,w}(\cos(180 - \theta_{i,w}) - \cos(180 - \theta_{i,w,initial})) + w_w \\ y = r_{i,w}(\sin(180 - \theta_{i,w}) - \sin(180 - \theta_{i,w,initial})) + t_d - X \end{cases}$$

according to some embodiments. $\theta_{i,w}$ is defined across a range of:

$$0 \leq \theta_{i,w} \leq 360 - \text{atan}\left(\frac{X}{w_w + r_{i,w}}\right)$$

according to some embodiments. For programming purposes, each of the range of $\theta_{i,w}$, $\theta_{nose}$, and $\theta_{CL}$ have a same step size, according to some embodiments. This results in vectors having a same number of elements which is useful for numerical comparison techniques, according to some embodiments.

Figure 5:
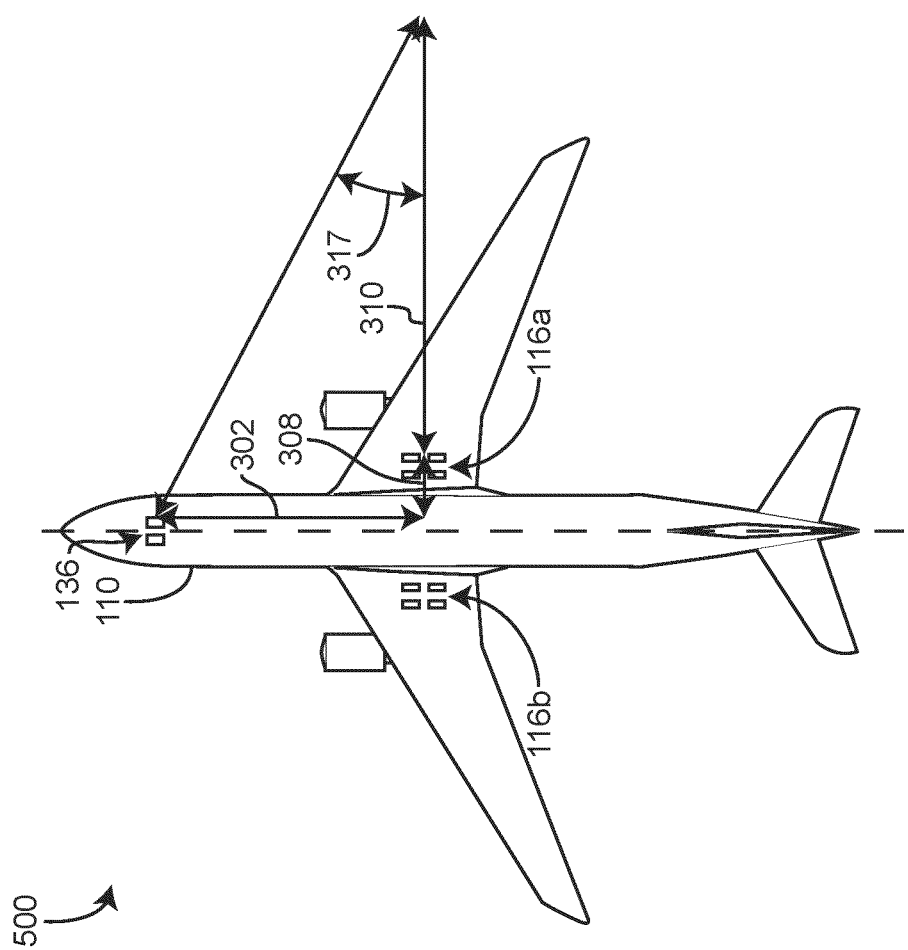
FIG. 5 is a diagram of an initial turn angle of an aircraft as it begins a turn along a taxiway, according to some embodiments.

Referring now to FIG. 5, a diagram 500 of initial nose angle 317 is shown, according to some embodiments. Initial nose angle 317 is determined using radius of curvature 310, distance 308, and distance 302, according to some embodiments. Initial nose angle 317 is defined mathematically as:

$$\theta_{nose,initial} = \tan^{-1}\left(\frac{X}{w_w + r_{i,w}}\right),$$

according to some embodiments.

Reward Calculations

Distance and Reward Calculations

An important feature of the environment is location of the wheels (e.g., rear landing gear 116a, rear landing gear 116b, front landing gear 136, etc.) relative to an edge of the taxiway (e.g., taxiway 108), according to some embodiments. In order to determine how far the wheels are from the edge of the taxiway (e.g., taxiway 108) one or more distances between the wheels and a centerline of the taxiway (e.g., centerline 112 of taxiway 108) are determined, according to some embodiments. The one or more distances between the wheels and the centerline of the taxiway are used to determine rewards, according to some embodiments.

Figure 6:
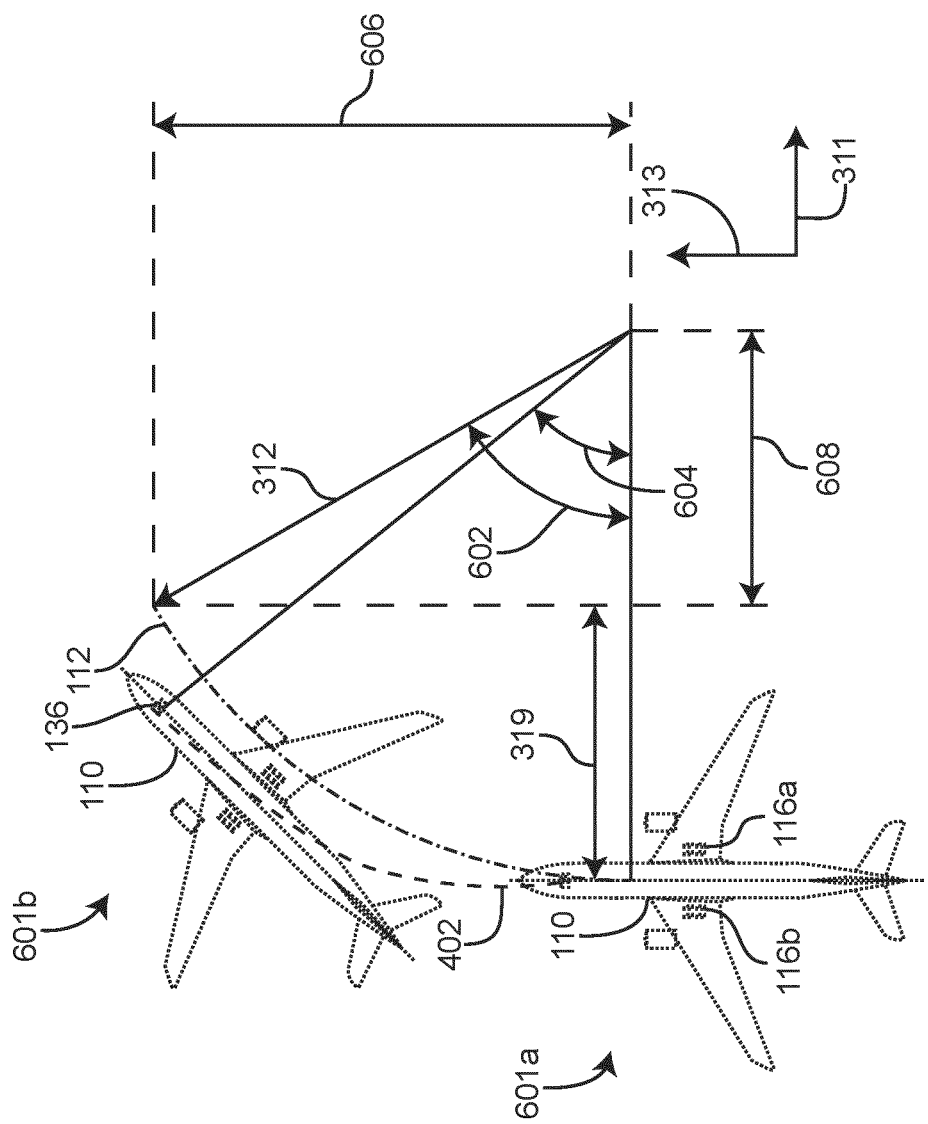
FIG. 6 is a diagram of an aircraft making a turn along a taxiway, according to some embodiments.

Referring now to FIG. 6, a diagram illustrating aircraft 110 making a turn is shown, according to some embodiments. FIG. 6 shows aircraft 110 transitioning between a first position, position 601a, and a second position, position 601b, according to some embodiments. In some embodiments, aircraft 110 steers from position 601a to position 601b over a time interval. As aircraft 110 steers from position 601a to position 601b, front landing gear 136 may produce nose path 402, according to some embodiments. In order to quantify nose path 402 as an appropriate path (i.e., nose path 402 results from appropriate oversteering with neither of rear landing gear 116b or rear landing gear 116a going over a taxiway edge), a distance between nose path 402 and centerline 112 is determined, according to some embodiments.

Centerline 112 is an arc, having constant radius 312 and an angle 602, according to some embodiments. Angle 602 is mathematically defined as $$\tan^{-1} \frac{\text{delta}_{y,T}}{\text{delta}_{x,T} - r_T}$$

where $\text{delta}_{y,T}$ is distance 606, $\text{delta}_{x,T}$ is distance 319, and $\text{delta}_{xT} - r_T$ is distance 608, according to some embodiments. Nose path 402 is shown defining an angle 604, according to some embodiments. In some embodiments, angle 604 is mathematically defined as $$\left(\tan^{-1} \frac{y}{x - r_T}\right).$$

In some embodiments, the difference between angle 602 and angle 604 is minimized. In some embodiments, by minimizing the difference between angle 602 and angle 604, it is more efficient to measure distance to centerline 112 as a tangential line. In some embodiments, a line tangent to nose path 402 is measured relative to centerline 112 to determine distance.

Curve 109 of taxiway 108 (see FIG. 3) follows an arc of constant radius $r_7$, (i.e., radius 312), according to some embodiments. Distance (d) to a center of curve 109 is mathematically defined as $d=\sqrt{(x-x_0)^2+(y-y_0)^2}$, according to some embodiments. The distance from which d is being measured $(x_0, y_0)$ is defined as center of curvature 305 $(r_T, 0)$, according to some embodiments. Therefore, distance $(d_{curve})$ along curve 109 is mathematically defined as $d_{curve}=\sqrt{(x-r_T)^2+(y-0)^2}-r_T$, where $\{\theta_{wheel}|0\leq\theta_{wheel}\leq\theta\}$ according to some embodiments. In some embodiments, x and y are functions, defined as a parametric function of θ.

A perpendicular distance from any point to a straight portion of centerline 112 is calculated for portions of taxiway 108 after curve 109, according to some embodiments. By definition, length of the line segment perpendicular to a line that passes through the point in question is minimum distance between that point and the line, according to some embodiments. This assumes, however, that the line is straight, according to some embodiments. To determine this distance, a line and a point are defined, according to some embodiments. The line is defined to include line points $L_1=(x_1, y_1, z_1)$ and $L_2=(x_2, y_2, z_2)$, according to some embodiments. The point may be defined as arbitrary point $P=(x, y, z)$, according to some embodiments. Line points $L_1$ and $L_2$, and point P include a z-axis, despite FIGS. 1-6 being two-dimensional, according to some embodiments. Therefore, all z coordinates are set to 0, according to some embodiments.

Once the initial point is defined, a basic function for a minimum distance between a line and a point is defined, according to some embodiments. A vector $\vec{a}$ is defined which represents the line, according to some embodiments. In some embodiments, the vector $\vec{a}$ is mathematically defined as $\vec{a}=L_1-L_2$. In some embodiments, a vector $\vec{b}$ is defined between point P and $L_2$. In some embodiments, the vector $\vec{b}$ is mathematically defined as $\vec{b}=P-L_2$. Using vector d and vector $\vec{b}$, a distance d between point P and the line is defined, according to some embodiments. In some embodiments, the distance d between point P and the line is mathematically defined as $$d = \frac{|\vec{a} \times \vec{b}|}{|\vec{a}|}.$$

Substituting the x and y points described above, the distance d equation becomes $$d = \frac{|\langle x_1 - x_2, y_1 - y_2, 0\rangle \times \langle x - x_2, y - y_2, 0\rangle|}{|\langle x_1 - x_2, y_1 - y_2, 0\rangle|},$$

according to some embodiments. The distance d equation is defined on $\{\theta_{wheel}|0\leq\theta_{wheel}\leq0\}$, according to some embodiments. However, after the nose wheel (i.e., front landing gear 136) has reached centerline 112 again, there is no benefit in continuing to use the distance d equation, according to some embodiments. Therefore, the distance d need only be calculated until distance d is equal to 0, according to some embodiments. Numerically, distance d need not be calculated when distance d becomes smaller than some very small number, according to some embodiments. In this case, the distance d may be mathematically defined as:

$\{\theta_{wheel} | \theta \leq \theta_{wheel} \leq \theta_{min,nose}\}$ where $\theta_{min,nose} =$ $$\theta \text{ at } 0 = \frac{|\langle x_1 - x_2, y_1 - y_2, 0\rangle \times \langle x - x_2, y - y_2, 0\rangle|}{|\langle x_1 - x_2, y_1 - y_2, 0\rangle|}$$

according to some embodiments.

Distance d must be calculated independently for each wheel, with the exception of the final nose position, according to some embodiments. All distance calculations only need to be calculated as far as aircraft 110 travels during the turn, according to some embodiments. Therefore, inner and outer wheels (i.e., rear landing gear 116a and rear landing gear 116b) do not stop at a same θ value, but rather at a same change in θ to keep all distances between wheels (i.e., rear landing gear 116a, rear landing gear 116b, front landing gear 136) constant, according to some embodiments. The distance calculations for each wheel are similar and change little, but involve using different starting parameters based on initial wheel position, radii, etc., according to some embodiments.

A reward for each episode is a calculation derived from the distance from each wheel (i.e., rear landing gear 116a, rear landing gear 116b, front landing gear 136) from centerline 112, according to some embodiments. The reward calculation may be simplified by performing the reward calculation at each wheel's maximum distance throughout the turn, according to some embodiments. In this way, a run is judged based on a worst situation it occupies, according to some embodiments. The reward calculations for each wheel are mathematically defined as:

$$reward_{wheel} = \begin{cases} \frac{-d_{max}}{w(0.8)} + 2 & d_{max} < w(0.8) \\ \frac{-d_{max} + w(0.8)}{w - w(0.8)} + 1 & w(0.8) \le d_{max} \le w \\ -10 & d_{max} > -10 \end{cases}$$

according to some embodiments.

A modification to the above defined reward calculations may be included to identify an invalid solution, according to some embodiments. Two methods may be used to identify an invalid solution, according to some embodiments. In some embodiments, the invalid solution comes about as a result of actions or the state space itself. One method includes noting when a distance calculation fails to converge, or when it converges well before completing the turn, according to some embodiments. In the case of this occurrence, the rewards for that wheel (i.e., the wheel associated with the failed and/or early convergence), is reduced by 10 as this occurrence indicates an incomplete and/or invalid turn, according to some embodiments. The other method involves when an invalid environment is chosen, as a result of a combination of the state spaces in such a way that the turn of the environment would never exist, according to some embodiments. This method may identify, for example, when width 306 of taxiway 108 is greater than radius 312 of curve 109 of taxiway 108, according to some embodiments. For any of the invalid environments, the reward for the whole environment is set to −60 (a most negative reward) to show that such an environment would not be traversed, according to some embodiments.

In some embodiments, the rewards range from −60 to 6. In some embodiments, each wheel going off taxiway 108 results in a reward of −10. Negative reward indicates at least one wheel exiting taxiway 108, according to some embodiments. In some embodiments, a magnitude of the reward indicates how many wheels went off of taxiway 108, how close wheels which did not go off taxiway 108 are relative to centerline 112, and therefore the severity of the transgression. For positive reward results, greater magnitude indicates greater consistency of the turn performed, and the more preferable the choice of said turn, according to some embodiments.

Example Graphs

Figure 7:
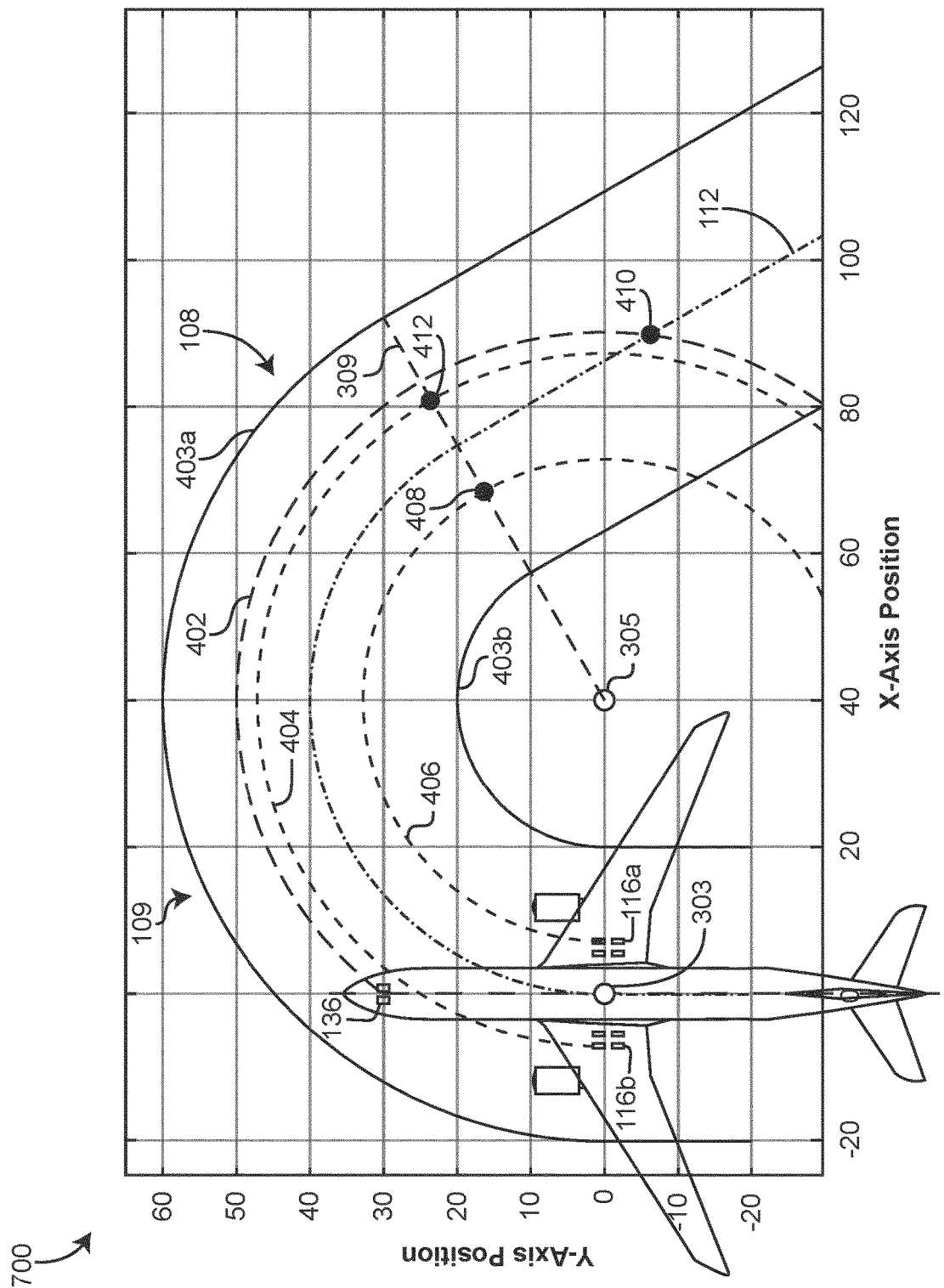
FIG. 7 is a graph of wheel paths of an aircraft making a turn along a taxiway as determined by a learning agent, according to some embodiments.
Figure 8A:
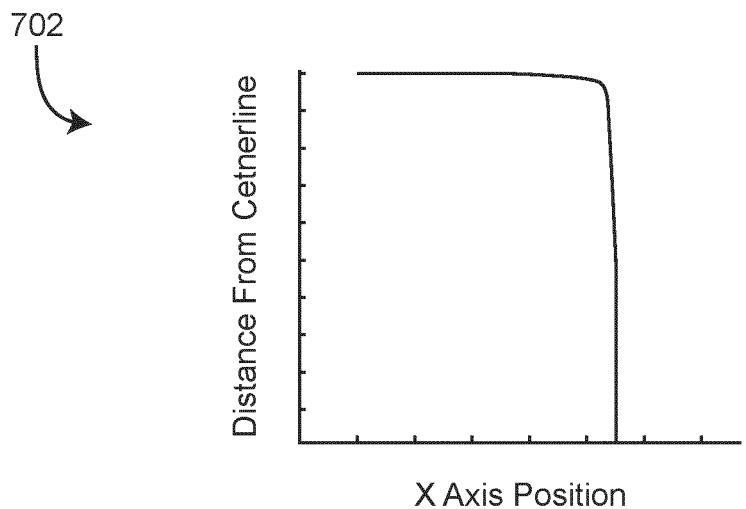
FIG. 8a is a graph of a distance between a nose wheel and a centerline of a taxiway of the graph of FIG. 7, according to some embodiments.
Figure 8B:
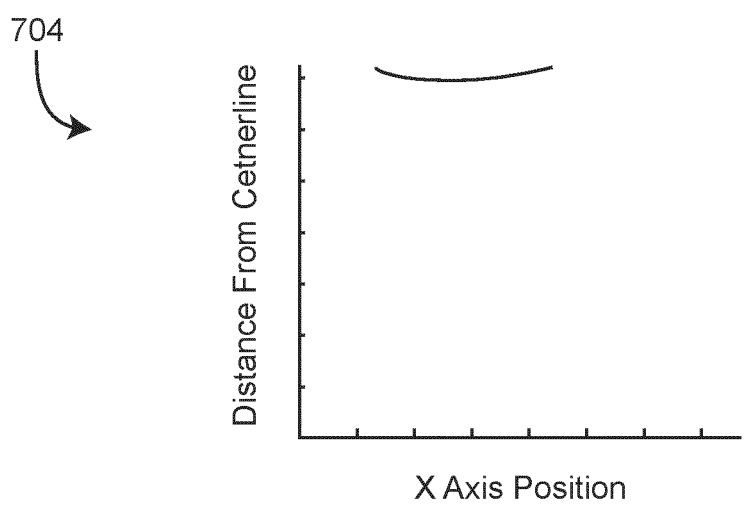
FIG. 8b is a graph of a distance between an inner wheel and a centerline of a taxiway of the graph of FIG. 7, according to some embodiments.
Figure 8C:
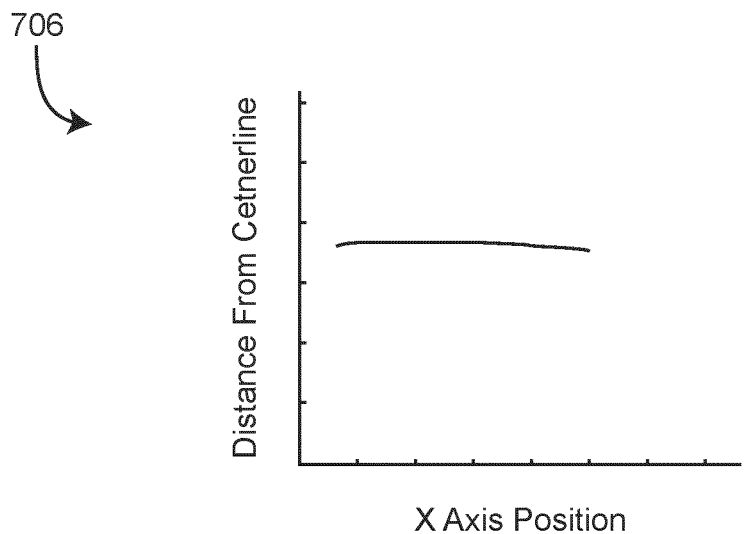
FIG. 8c is a graph of a distance between an outer wheel and a centerline of a taxiway of the graph of FIG. 7, according to some embodiments.

Referring now to FIGS. 7-8c, several graphs of distance calculations and paths after a run are shown, according to some embodiments. In some embodiments, FIGS. 7-8c illustrate a preferable set of paths and preferable distance calculations.

Referring to FIG. 7, a graph 700 is shown illustrating various paths of wheels of aircraft 110 as aircraft 110 makes a turn along curve 109 taxiway 108, according to some embodiments. In some embodiments, taxiway 108 includes a first edge, shown as outer edge 403a, and a second edge, shown as inner edge 403b. Inner edge 403b and outer edge 403a define taxiway 108, according to some embodiments. Specifically, inner edge 403b and outer edge 403a define constraints which wheels of aircraft 110 must stay within as aircraft 110 travels along curve 109 of taxiway 108, according to some embodiments. Graph 700 is shown to include origin 303, according to some embodiments. As described in greater detail above, origin 303 has x-axis position and y-axis position of (0,0), according to some embodiments.

Referring still to FIG. 7, rear landing gear 116b and rear landing gear 116a are shown to define path 404 and path 406 as aircraft 110 completes the turn around curve 109 of taxiway 108, according to some embodiments. Front landing gear 136 defines path 402 as aircraft 110 completes the turn around curve 109 of taxiway 108, according to some embodiments. Any of the methods described in greater detail above are used to determine distance between centerline 112 of taxiway 108 and any of path 402, path 404 and path 406, according to some embodiments. In some embodiments, the distance between centerline 112 of taxiway 108 and any of path 402, path 404, and path 406 is graphed to demonstrate a graphical representation of the determined distance. The position of aircraft 110 shown in FIG. 7 indicates a position at which a tiller-induced turn around curve 109 of aircraft 110 begins, according to some embodiments. Marker 408, marker 410 and marker 412 indicate a final position of rear landing gear 116a, front landing gear 136, and rear landing gear 116b, respectively, after aircraft 110 has completed the turn around curve 109 of taxiway 108, according to some embodiments.

The run shown in FIG. 7 results in a reward of 5.8314, according to some embodiments. The reward resulting from the run shown in FIG. 7 is very close to the maximum reward of 6, according to some embodiments.

Referring now to FIGS. 8a-8c, several graphs are shown, according to some embodiments. FIG. 8a shows a graph 702 of nose wheel (i.e., front landing gear 136) distance from centerline 112 versus x-axis position, according to some embodiments. FIG. 8b shows a graph 704 of inner wheel (i.e., rear landing gear 116a) distance from centerline 112 versus x-axis position, according to some embodiments. FIG. 8c shows a graph 706 of outer wheel (i.e., rear landing gear 116b) distance from centerline 112 versus x-axis position, according to some embodiments.

Reward Per Episode

Figure 9:
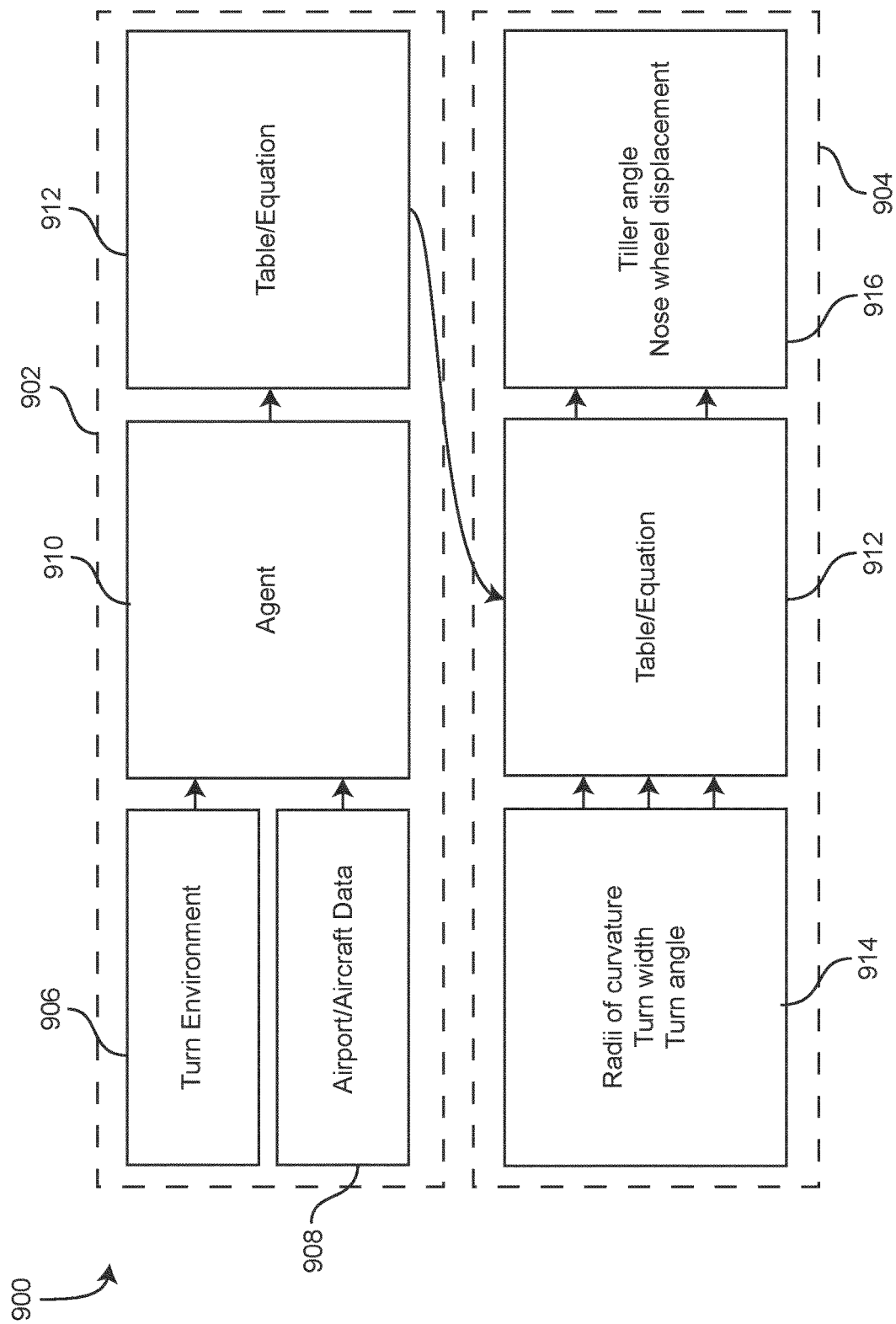
FIG. 9 is a block diagram of a learning agent and an aircraft, according to some embodiments.
Figure 12:
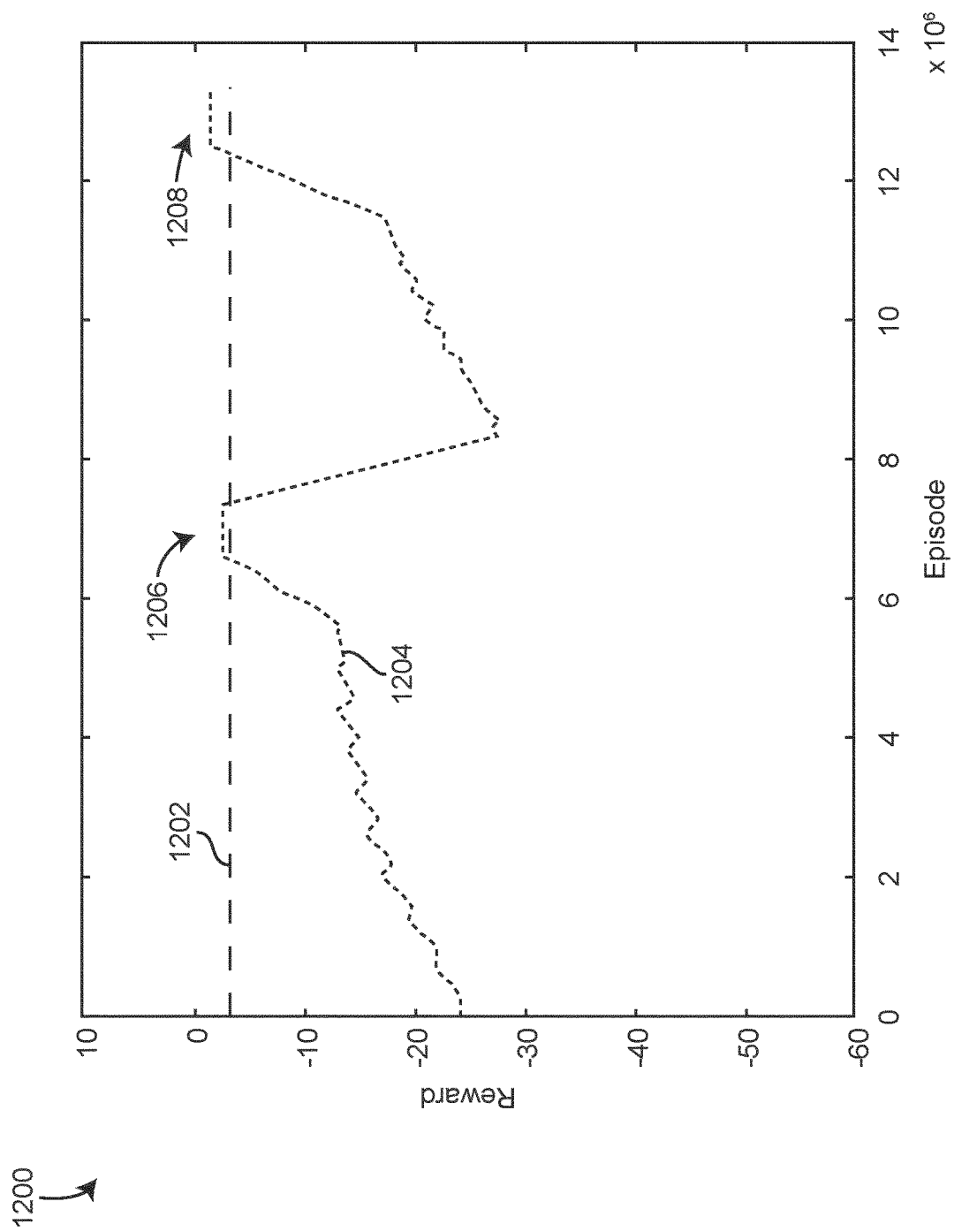
FIG. 12 is a graph of an average reward per episode of a learning agent, according to some embodiments.

Referring now to FIG. 12, a graph 1200 illustrates reward per episode (vertical axis) versus episode number (horizontal axis) of the agent (e.g., agent 910 as shown in FIG. 9), according to some embodiments. In some embodiments, series 1204 represents an average reward per episode. In some embodiments, boundary 1202 represents an 87.5% span of the reward. The average reward per episode can be seen to increase across training (e.g., as more episodes are performed), according to some embodiments. It is important to note plateau portions of series 1204. It has been proven that Q-Learning is a convergent algorithm, however, the value converged to is dependent upon the environment and learning method, according to some embodiments. First plateau portion 1206 of series 1204 represents a first convergence of the Q-Learning, according to some embodiments. In some embodiments, the first convergence of the Q-Learning is shown converging to 88%. In some embodiments, this is a fairly desirable result.

One method to potentially train an agent (e.g., agent 910) is to force the agent to revisit and explore low-reward situations, according to some embodiments. In some embodiments, the agent is forced to revisit and explore low-reward situations in response to converging to a value. As shown by second plateau portion 1208, after the agent was forced to revisit and explore low-reward situations, the agent converged to 90%, according to some embodiments.

It is important to note that 90% does not mean that the agent fails 10% of the time, according to some embodiments. Rather, 90% means that there is a percentage of the time that the agent determines itself unfit or unnecessary for the turn, according to some embodiments. For example, if the turn is very long and wide, the agent may decide that it is in fact unsuited to the turn, and simply suggest that the pilot follow the centerline, according to some embodiments. In some embodiments, if a turn is too sharp and/or too narrow for a large aircraft to navigate, the agent recognizes this and tells the pilot (e.g., through a user interface) that the turn is not feasible under such circumstances. The pilot then knows that they must navigate the turn using any of asymmetric thrust, differential steering, etc., or take another turn entirely, according to some embodiments. In some embodiments, the agent can recognize when it is useful to the pilot or when it is more desirable for the pilot to make the turn themselves.

Figure 13:
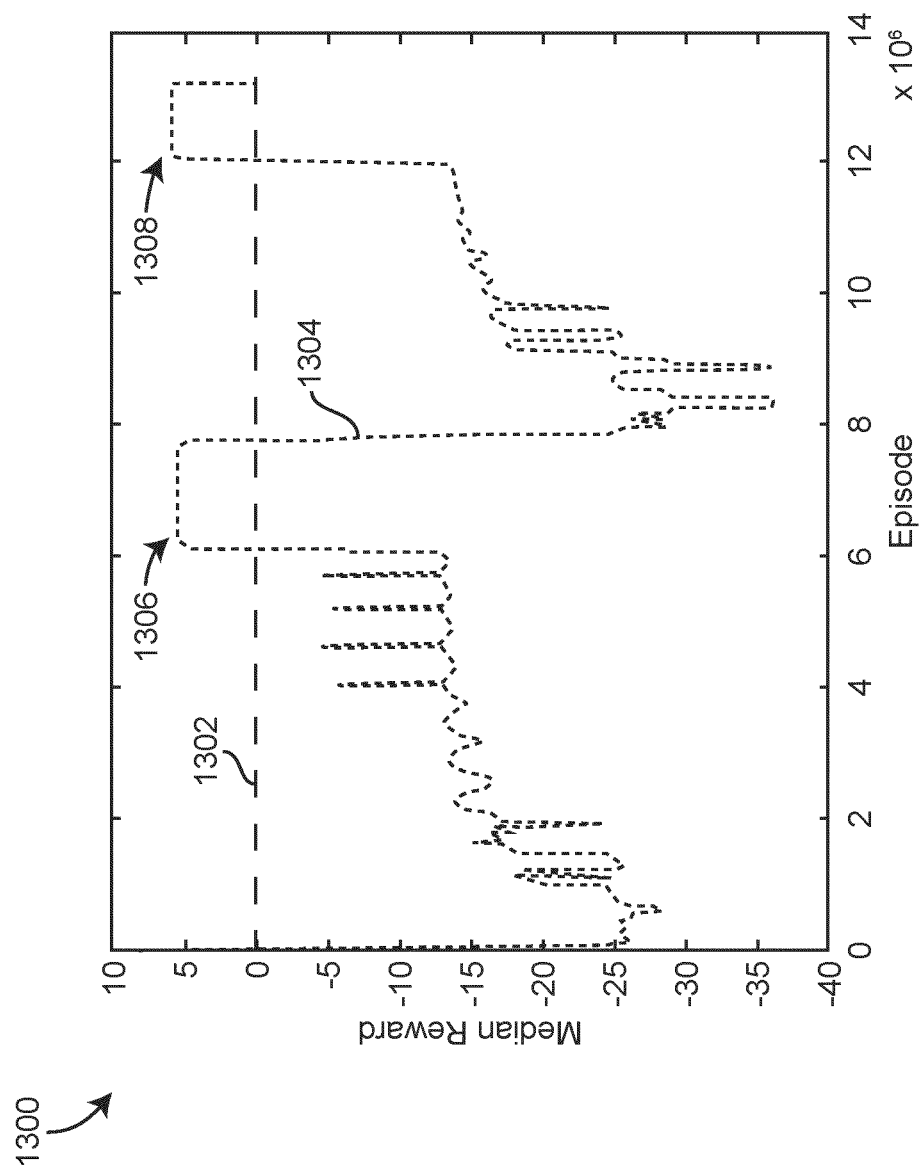
FIG. 13 is a graph of a median reward per episode of a learning agent, according to some embodiments.

Referring now to FIG. 13, graph 1300 illustrates another way of looking at the reward, according to some embodiments. The vertical axis of graph 1300 represents median reward per episode, according to some embodiments. The horizontal axis of graph 1300 represents the episode number of the agent, according to some embodiments. Series 1304 represents the median reward per episode, according to some embodiments. Boundary 1302 represents a 90% passing boundary of the median reward per episode, according to some embodiments. Series 1304 includes a first plateau portion 1306 (i.e., a first convergence) and a second plateau portion 1308 (i.e., a second convergence), according to some embodiments. In some embodiments, graph 1300 represents the same rewards data as graph 1200. In some embodiments, analyzing the median reward per episode provides additional insight to trends of the training data.

Reducing Processing Requirements

In order to reduce processing requirements, a numerical analysis is used to create the environment and to train the reinforcement learning agent (e.g., agent 910), according to some embodiments. Numerical analysis is often faster and requires less processing, according to some embodiments. Since the environment requires large quantities of environment creations, numerical analysis is used, according to some embodiments.

In some embodiments, a pass by constant reference parameter method is used. The pass by constant reference method is advantageous when dealing with large data sets, according to some embodiments. In some embodiments, a pass by constant reference method is approximated using class objects. In some embodiments, environment class objects are used. Advantageously, when a class is passed in a function, the class is passed by reference and not copied, according to some embodiments. Unless a value within the set of class variables itself is being changed, the class does not need to be copied or returned, according to some embodiments. In some embodiments, the class is not returned since it is not modified. Instead, according to some embodiments, the result of the calculation is added. This allows a single class object to be updated without passing and copying the class each time, according to some embodiments. However, this may only be beneficial when the parameter being passed is relatively small, according to some embodiments. If the parameter passed is relatively large, an entire class is passed and returned, according to some embodiments.

Learning Agent

Figure 11:
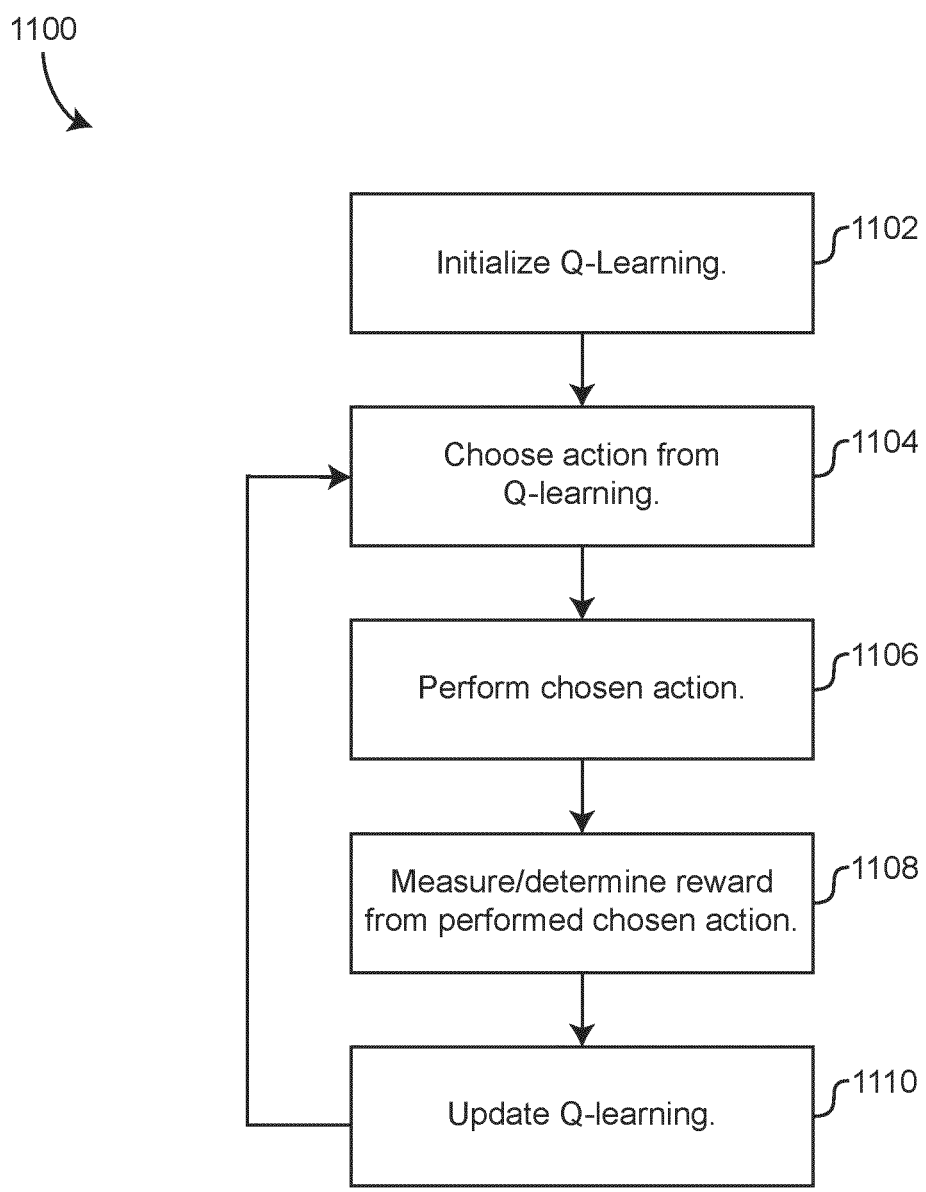
FIG. 11 is a block diagram of process of a Q-Learning reinforcement learning algorithm, according to some embodiments.

Referring now to FIG. 11, a process 1100 of Q-Learning performed by any learning agent (e.g., agent 910) is shown, according to some embodiments. In some embodiments, process 1100 is performed to determine optimal control of steering elements of the aircraft (i.e., speed, turn of front landing gear 136, tiller/nose wheel angle, etc.) to perform the oversteer.

Agent 910 is configured to create a state space which contains all possible initial conditions, according to some embodiments. Each dimension of the state space (e.g., each way in which the state space could differ) is represented by a dimension of the state space, according to some embodiments. In some embodiments, the state space is a Q-matrix having an appropriate number of columns and rows. In some embodiments, the state space dimensions are the aircraft (e.g., aircraft 110), width of the taxiway (e.g., $w_w$), radius of the turn, and angle of the turn. The action space determines dimensions in which the agent may act (e.g., tiller angle, nose displacement distance, etc.), according to some embodiments.

Referring still to FIG. 11, process 1100 is shown to include steps 1102-1110, according to some embodiments. Step 1102 recites initializing the Q-Learning algorithm, according to some embodiments. In some embodiments, step 1102 is performed by agent 910. In some embodiments, initializing the Q-Learning algorithm includes generating the Q-matrix. Step 1104 recites choosing an action based on the Q-learning, according to some embodiments. Step 1106 recites performing the chosen action, according to some embodiments. In some embodiments, the chosen action is simulated by agent 910 and rewards are determined/measured based on the performed chosen action (step 1108). In some embodiments, the rewards are determined/measured according to any of the methods discussed in the Rewards Calculation section. In some embodiments, the Q-learning is updated (step 1110) in response to the measured/determined rewards and/or the completion of the chosen action.

The Q-update step 1110 is mathematically represented by the following Q-update algorithm:

$$Q(s_t,a_t) \leftarrow Q(s_t,a_t) + \alpha[r_{t+1} + \lambda Q(s_{t+1},a) - Q(s_t,a_t)]$$

according to some embodiments. In some embodiments, $Q(s_t, a_t)$ is the value of a probable reward matrix (Q) at a particular state $(s_t)$ for a particular set of action(s) $(a_t)$. Each time the agent runs through an environment, it updates the Q $(s_t, a_t)$ with the current value and the learning rate ($\alpha$) multiplied by the update value, according to some embodiments. In some embodiments, the learning rate is a number between 0 and 1 that determines the extent to which new information overrides old information. The update value consists first of the reward for the action $(r_{t+1})$, according to some embodiments. In some embodiments, this reward does not necessarily exist for every action, and may be based on a variety of factors. In some embodiments, the next value in the update value is discount factor ($\lambda$) which determines how much future rewards are worth when compared to the value of immediate rewards. In some embodiments, the discount factor ($\lambda$) is multiplied by $Q(s_{t+1}, a)$ which refers to a value (usually a maximum value) of all the Q matrix possible actions at the next state. This process is how the rewards trickle back down through the action tree, according to some embodiments. The last term in the update value is $Q(s_t, a_t)$ again, according to some embodiments. In some embodiments, this term normalizes the function preventing a statistically insignificant (but possibly more travelled) action from gaining undue acclaim.

In some embodiments, the Q-Learning is iteratively performed for multiple episodes to determine an optimal turn. In some embodiments, results are verified using any of the verification methods described in greater detail above with reference to FIGS. 12-13 and 7-8*c*. In some embodiments, the agent outputs any of an equation, a set of equations, a table, a matrix, etc., to determine the optimal turn for a specific taxiway. In some embodiments, the Q-Learning is performed for various environments (e.g., different turns having different turn characteristics) and for various aircraft (e.g., having different turn radii, different centers of rotation, etc.). In some embodiments, the equation is output to an on-board aircraft controller for use. In some embodiments, the equation (or table or matrix, etc.) has the form $$[\theta_{nose\ wheel}, X] = f(r_T, w_{taxiway}, \theta_{taxiway})$$

where $\theta_{nose\ wheel}$ is an angle of the nose wheel of the aircraft (e.g., front landing gear 136), X is a nose wheel displacement (e.g., a distance past a start of the turn), $r_T$ is a radius of the turn, $w_{taxiway}$ is a width of the taxiway (e.g., 2*w) and $\theta_{taxiway}$ is an angle of turn of the taxiway (e.g., an overall angle of the taxiway turn).

Airport and Aircraft Classification

In some embodiments, the agent receives various environmental information regarding an airport. Airports are classified in several ways based on the type of aircraft they can accept both on a regular basis (e.g., a scheduled basis) and for diversions, according to some embodiments. The International Civil Aviation Organization (ICAO) is an agency of the United Nations that governs air navigation standard to ensure safety and orderly growth, according to some embodiments. In some embodiments, the aircraft (e.g., aircraft 110 or any aircraft the agent is used by) is rated according to a code set by the ICAO. In some embodiments, the aircraft is rated based on any of aircraft reference field length, wingspan, outer main gear wheel span, and a combination of both. In some embodiments, an equivalent United States system is used. For example, the Federal Aviation Administration (FAA) uses a similar, although slightly different aircraft and airport classification tool called the Airplane Design Group (ADG). In some embodiments, the agent classifies the aircraft according to the ADG. In some embodiments, the aircraft is classified into one of multiple groups based on at least one of tail height and wingspan, or a combination of both. In some embodiments, the agent is configured to convert between the ICAO code and the ADG code. For example, the agent determines that Group 1 of the ADG corresponds to group A of the ICAO, Group 2 of the ADG corresponds to group B of the ICAO, etc., according to some embodiments. In some embodiments, various airports are rated by the FAA and/or the ICAO based on which groups or types of aircraft the airports can accept.

Pre-Processing Program

Referring now to FIGS. 14-18 and 21, an example of a pre-processing program performed is shown, according to some embodiments. The Austin-Bergstrom International Airport (KAUS) is chosen for the example set up process, since it can feasibly land an ICAO 4F (ADG IV) aircraft, yet is not a typical route for such aircraft, according to some embodiments. In this way, the aircraft is asked to taxi (either by itself or with a tug) at an airport the pilot would be unfamiliar with and has taxiways smaller than the aircraft typically encounters. KAUS airport is a diversion airport for both DFW (Dallas) and IAH (Houston) of FAA ADG VI (e.g., B748, A380) aircraft. However, KAUS does not have flights of that design group on a regular basis. KAUS is codified to be able to handle FAA ADG V (B744, B777, B787, A330, A340) aircraft for regularly scheduled flights. For this reason, KAUS is not equipped for regular FAA ADG VI taxiway traffic, and therefore may be challenging for such a large aircraft to navigate (e.g., may require many applications of oversteer), according to some embodiments.

The agent utilizes a table lookup method of the Q-Matrix in order to determine optimal actions for a specified environment, according to some embodiments. A pre-processing program (e.g., method, process, algorithm, etc.) takes in data from a database regarding the environment (e.g., the airport), processes it, performs various calculations, and produces inputs necessary to describe the environment for the agent, according to some embodiments. This pre-processing program is universal, meaning it may receive information regarding any given taxiway to perform the calculations to determine the inputs, according to some embodiments. In some embodiments, the pre-processing program is based off of mathematical/geometric principles, described in greater detail hereinbelow.

Figure 16:
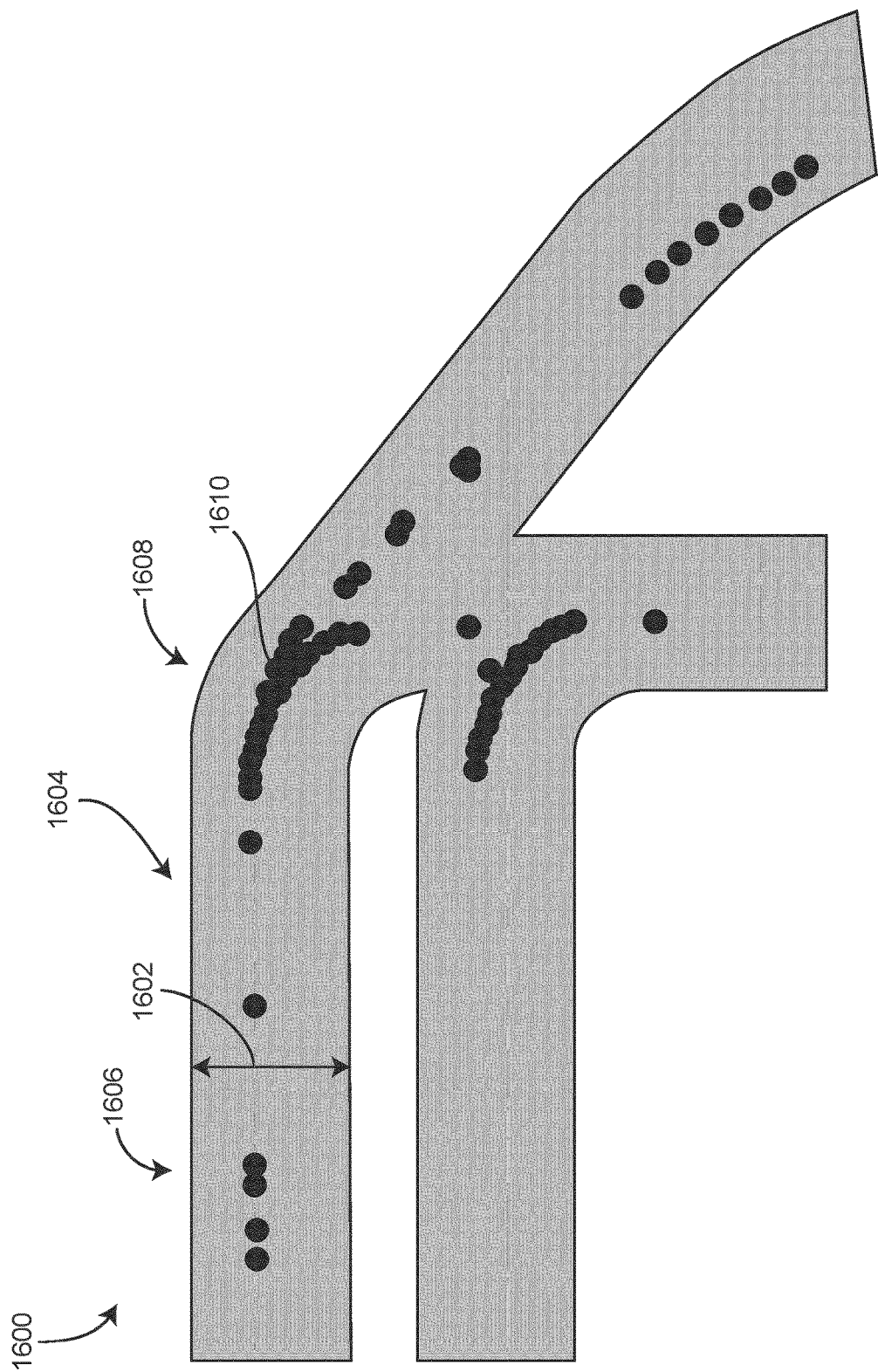
FIG. 16 is a diagram of airport map data, according to some embodiments.

In some embodiments, the pre-processing program receives airport maps from ARINC 816-0 database without any Airport Surface Routing Network (ASRN). FIG. 16 shows a portion of an airport map 1600, according to some embodiments. In some embodiments, the airport maps include taxiway width along various taxiways. For example, taxiway 1604 is shown to have a straight taxiway portion 1606 and a curved taxiway portion 1608, according to some embodiments. In some embodiments, straight taxiway portion 1606 has a width 1602. In some embodiments, scatter data 1610 is included which defines a centerline of taxiway 1604. It can be seen that more scatter data 1610 is included along curved taxiway portion 1608, according to some embodiments. In some embodiments, scatter data 1610 is further processed using at least one of a smoothing technique, a linear curve fit, a polynomial curve fit, etc. In some embodiments, certain data of scatter data 1610 is discarded before scatter data 1610 is further processed. In some embodiments, outlier data points of scatter data 1610 are removed to improve the accuracy of scatter data 1610.

Figure 14:
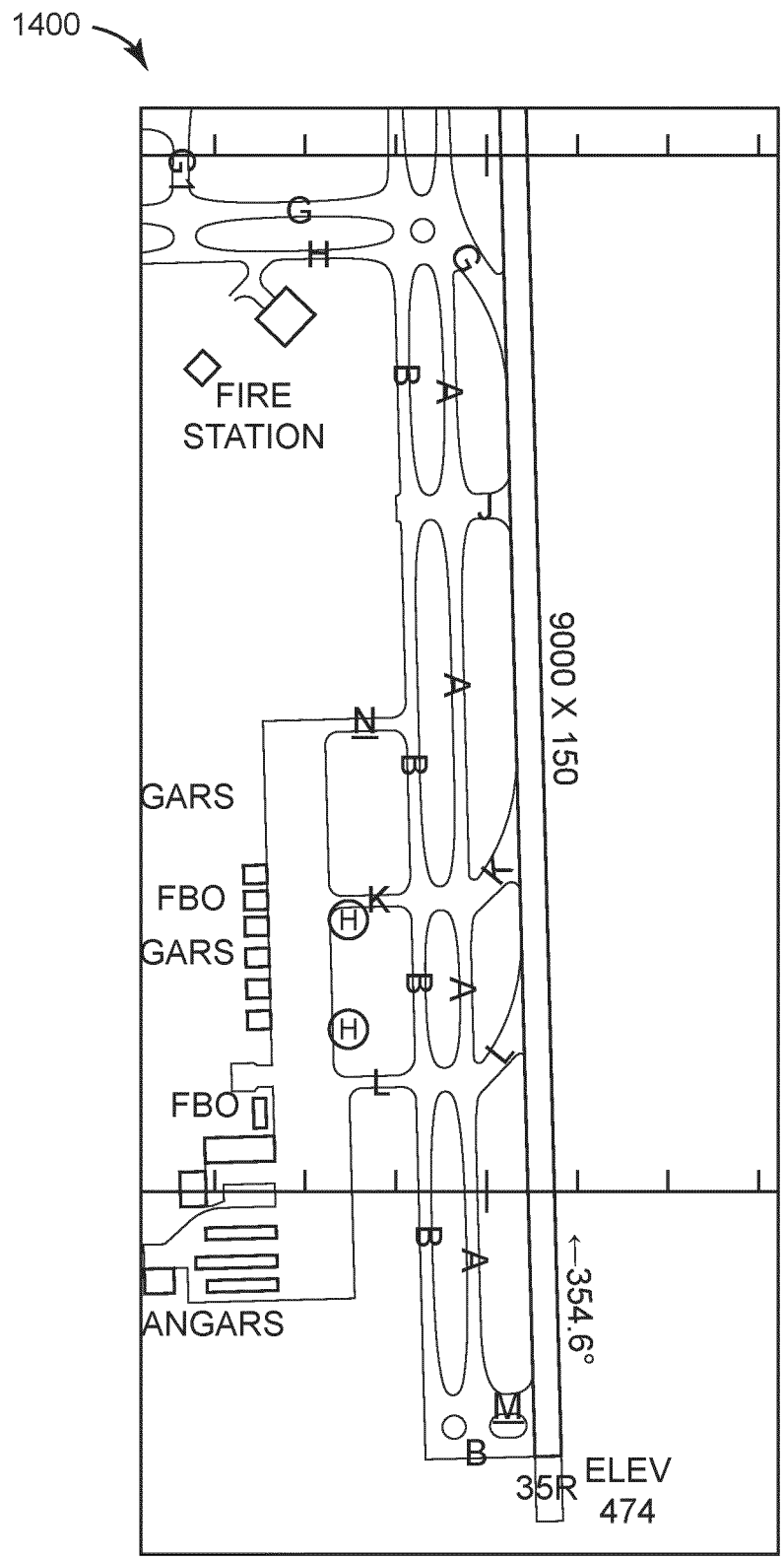
FIG. 14 is an airport map, according to some embodiments.

Referring to FIG. 14, an airport map 1400 of KAUS airport is shown, according to some embodiments. In some embodiments, the agent and/or the pre-processing program receives the airport map 1400 from a database (e.g., an FAA database, ARINC database, etc.). In some embodiments, a route of the aircraft is determined by any of the pilot, the air traffic control, and is received by any of the agent and the pre-processing program. In the example process, the desired path (e.g., the route) begins with landing on 35R, then taxiing along taxiway G, taxiway A, and taxiway L to the hangars.

In some embodiments, the pre-processing program calculates angles between any of the taxiways and/or the runway (e.g., an angle between taxiway G and runway 35R, an angle between taxiway G and taxiway A, etc.). In some embodiments, the pre-processing program uses information regarding the airport and any geometric principles to determine the angles.

In some embodiments, the pre-processing program calculates width of the taxiway by choosing any two points along the edge of any of the taxiway which form a line, and any other point on the opposite edge of the taxiway. In some embodiments, a vector is used for each point (e.g., between each of the points), resulting in three dimensions. In some embodiments, a function is used to determine the taxiway width based on the three points.

In some embodiments, the pre-processing program calculates the radius of curvature of each of the turns between the taxiways (e.g., a turn between taxiway G and taxiway A, etc.). The pre-processing program takes three points along an edge of the taxiway and determines both the center of the turn and the curvature of the turn, according to some embodiments.

Figure 15:
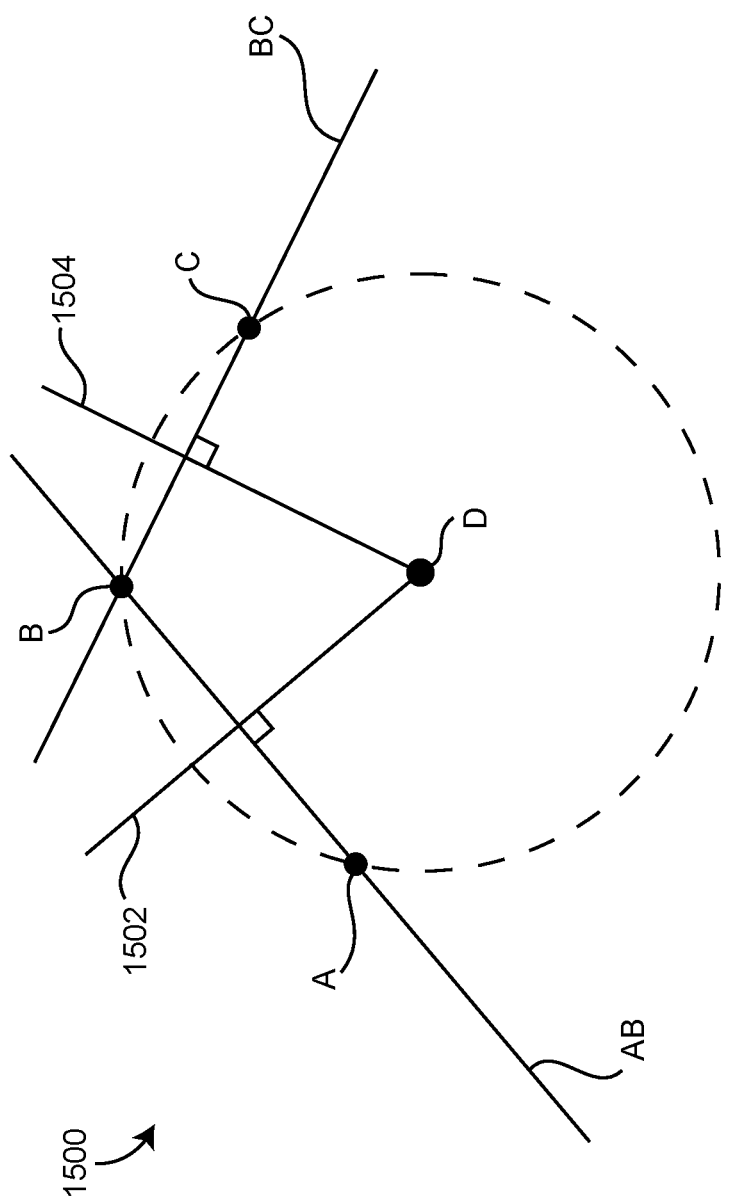
FIG. 15 is a diagram illustrating a determination of radius of curvature of a taxiway turn.

Referring to FIG. 15, diagram 1500 illustrates the method/process of calculating the radius of curvature of the turn, according to some embodiments. The three points of the taxiway are shown as point A, point B, and point C, according to some embodiments. In some embodiments, the turn has a center D. The pre-processing program receives/determines/calculates coordinates of each of point A, point B, and point C, according to some embodiments. In some embodiments, point A has coordinates {xA, yA}, point B has coordinates {xB, yB}, point C has coordinates {xC, yC}, and center D has coordinates {xD, yD}. In some embodiments, a line AB is defined as passing through point A and point B, and a line BC is defined as passing through point B and point C. In some embodiments, mid-points of line AB and line BC are determined. The midpoint of line AB is calculated and defined as:

$$\text{mid}_{AB} = \left\{\frac{xA + xB}{2}, \frac{yA + yB}{2}\right\}$$

and the midpoint of line BC is calculated and defined as $$\text{mid}_{BC} = \left\{\frac{xB + xC}{2}, \frac{yB + yC}{2}\right\},$$

according to some embodiments. In some embodiments, a slope of one or more of line AB and line BC is determined. The slope of line AB is calculated and defined as:

$$\text{slope}_{AB} = \frac{yB - yA}{xB - xA},$$

according to some embodiments. The slope of line BC is calculated and defined as:

$$\text{slope}_{BC} = \frac{yC - yB}{xC - xB},$$

according to some embodiments. In some embodiments, lines are constructed which intersect the midpoints of line AB and line BC and center D, and are perpendicular to line AB and line BC. For example, line 1502 extends from center D, passes through the midpoint of line AB and is perpendicular to line AB, according to some embodiments. Likewise, line 1504 extends from center D, passes through the midpoint of line BC and is perpendicular to line BC, according to some embodiments.

In some embodiments, the slopes of each of line 1502 and line 1504 are calculated. The slope of line 1502 is calculated and defined as: $\text{slope}_{perp,AB} = -(\text{slope}_{AB})^{(-1)}$, according to some embodiments. The slope of line 1504 is calculated and defined as: $\text{slope}_{perp,BC} = -(\text{slope}_{BC})^{(-1)}$, according to some embodiments.

In some embodiments, a full equation for each of line 1502 and line 1504 are determined. In some embodiments, a function is used to determine the full linear equation of each of line 1502 and line 1504 based on any of the slope of line 1502, the slope of line 1504, the midpoint of line AB, and the midpoint of line BC. In some embodiments, the full equations of each of line 1502 and line 1504 are set equal to each other to determine a location of the point of intersection of line 1502 and line 1504. In some embodiments, the point of intersection of line 1502 and line 1504 is center D. In some embodiments, the full equations of line 1502 and line 1504 have the form y=mx+b.

In some embodiments, a Euclidean distance from center D to one of points A-C is determined. In some embodiments, the radius is determined and defined as $r = \sqrt{(xD-xA)^2 + (yD-yA)^2}$.

In some embodiments, the pre-processing program calculates a starting position to begin turning (e.g., operating landing gear of the aircraft to make the turn) and an ending position to stop turning.

Figure 17:
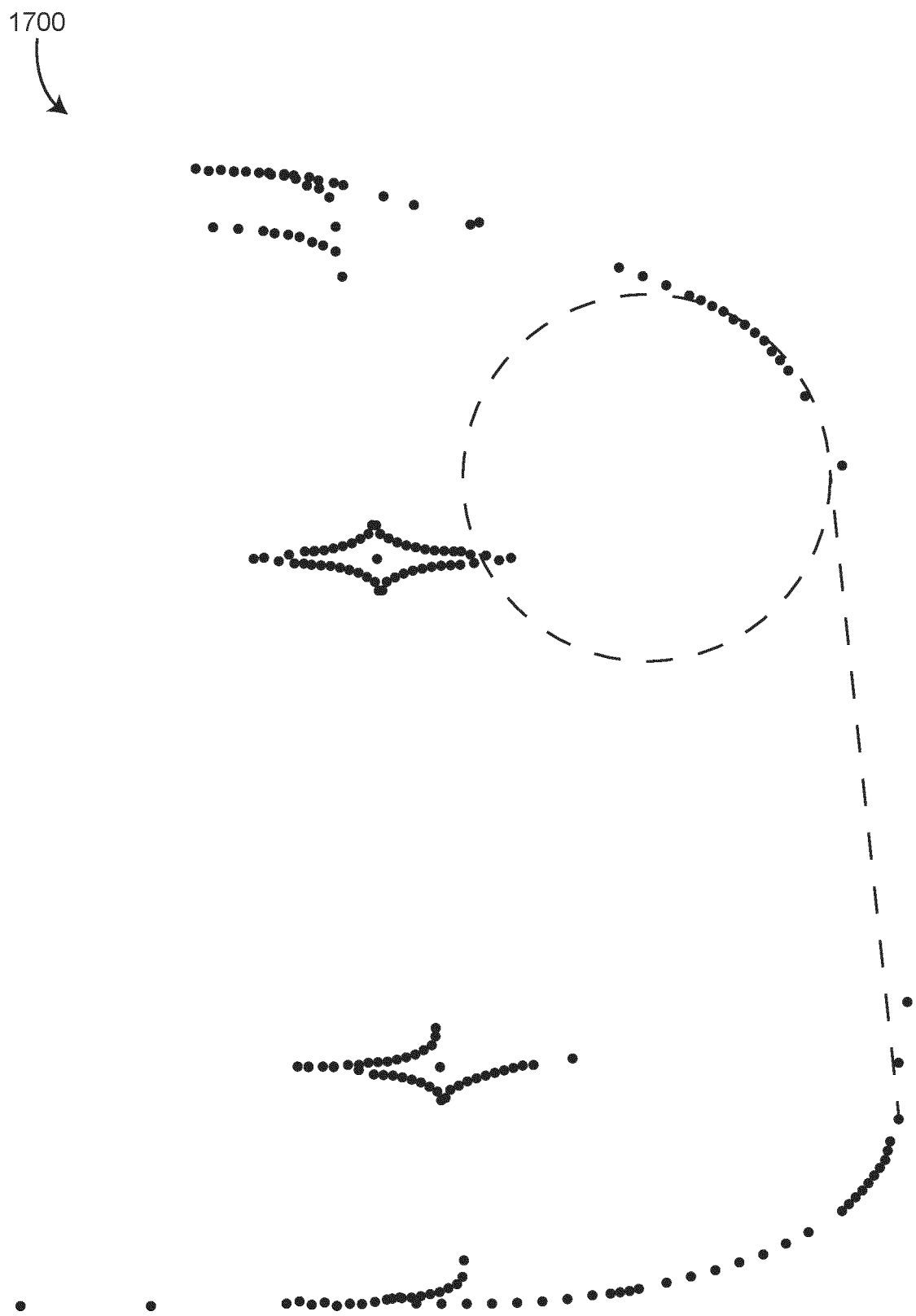
FIG. 17 is a diagram of airport map data, according to some embodiments.
Figure 18:
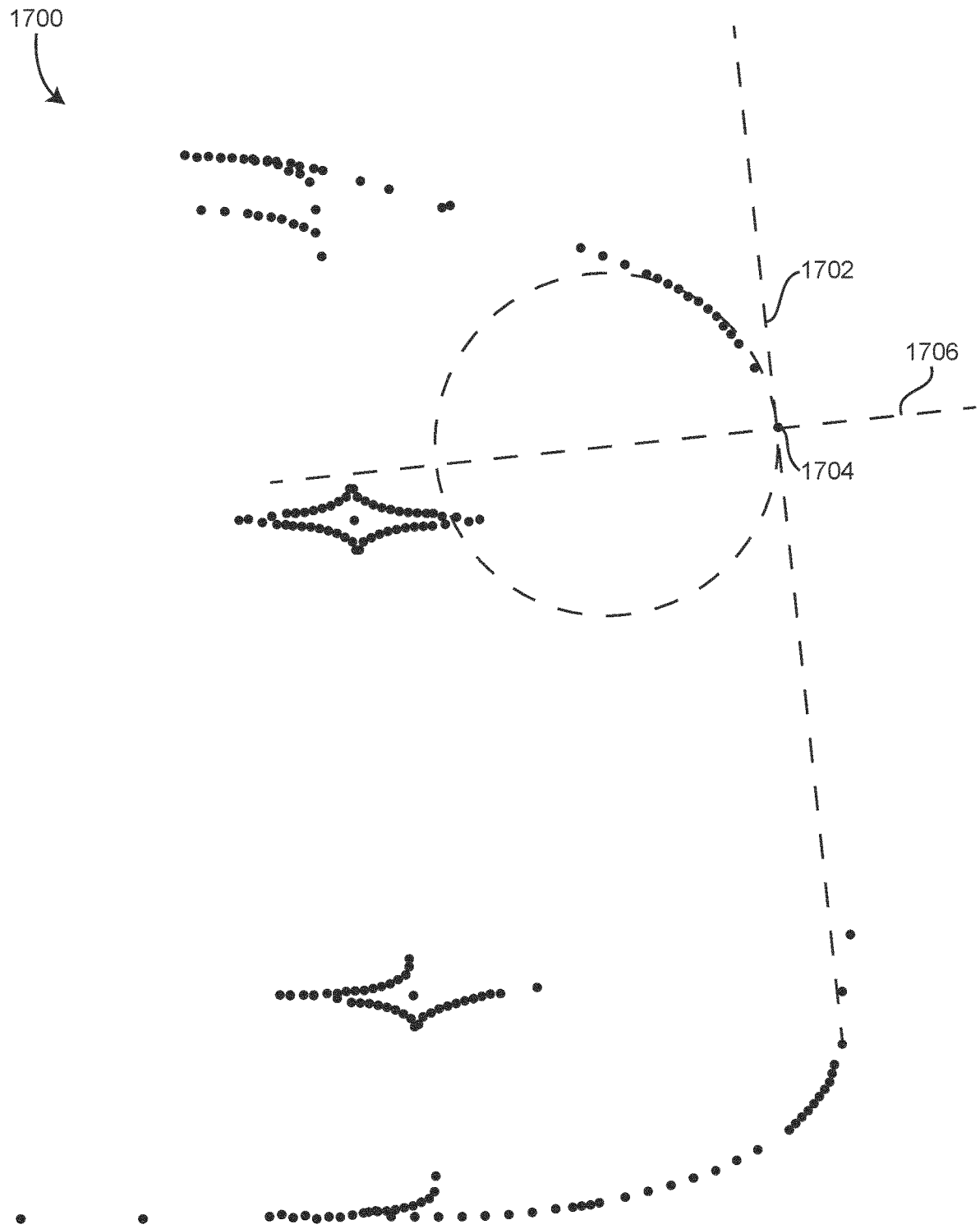
FIG. 18 is a diagram of airport map data, according to some embodiments.

Referring now to FIGS. 17-18, an airport map 1700 of at least a portion of KAUS airport is shown, according to some embodiments. In some embodiments, the airport map 1700 includes widths of various taxiways, and scatter data indicating a centerline of various taxiways. The goal is to approximate where one taxiway begins to curve onto another taxiway, or where the runway begins to curve onto a taxiway, according to some embodiments. This is achieved by determining the closest point from a center of the curvature (e.g., center D) to an extended infinite line created by the direction of the previous runway.

In some embodiments, the pre-processing program takes coordinates of the center of curvature (e.g., center D) and calculates a slope of the runway and a y-intercept for the runway to determine a full equation for the runway. In some embodiments, the runway is represented by centerline 1702. In some embodiments, the runway is represented by a straight line. Likewise, if the turn of the taxiway results from a transition from a first taxiway to a second taxiway, the full equation of the first taxiway is determined, similarly as described herein.

In some embodiments, the pre-processing program determines a centerline 1706 which extends perpendicularly from centerline 1702 and passes through the center of curvature of the turn (e.g., center D). In some embodiments, the slope of centerline 1706 is calculated and defined by: $\text{slope}_{perpendicular} = -(\text{slope}_{runway})^{(-1)}$, where $\text{slope}_{perpendicular}$ is the slope of centerline 1706, and $\text{slope}_{runway}$ is the slope of centerline 1702 (e.g., the slope of the runway or the slope of the first taxiway). In some embodiments, the pre-processing program determines a location (e.g., x and y coordinates) of point 1704 where centerline 1706 and centerline 1702 intersect. In some embodiments, point 1704 indicates where the curve begins. In some embodiments, a point where the curve ends is determined similarly. In some embodiments, this process is repeated for all subsequent taxiways.

Figure 21:
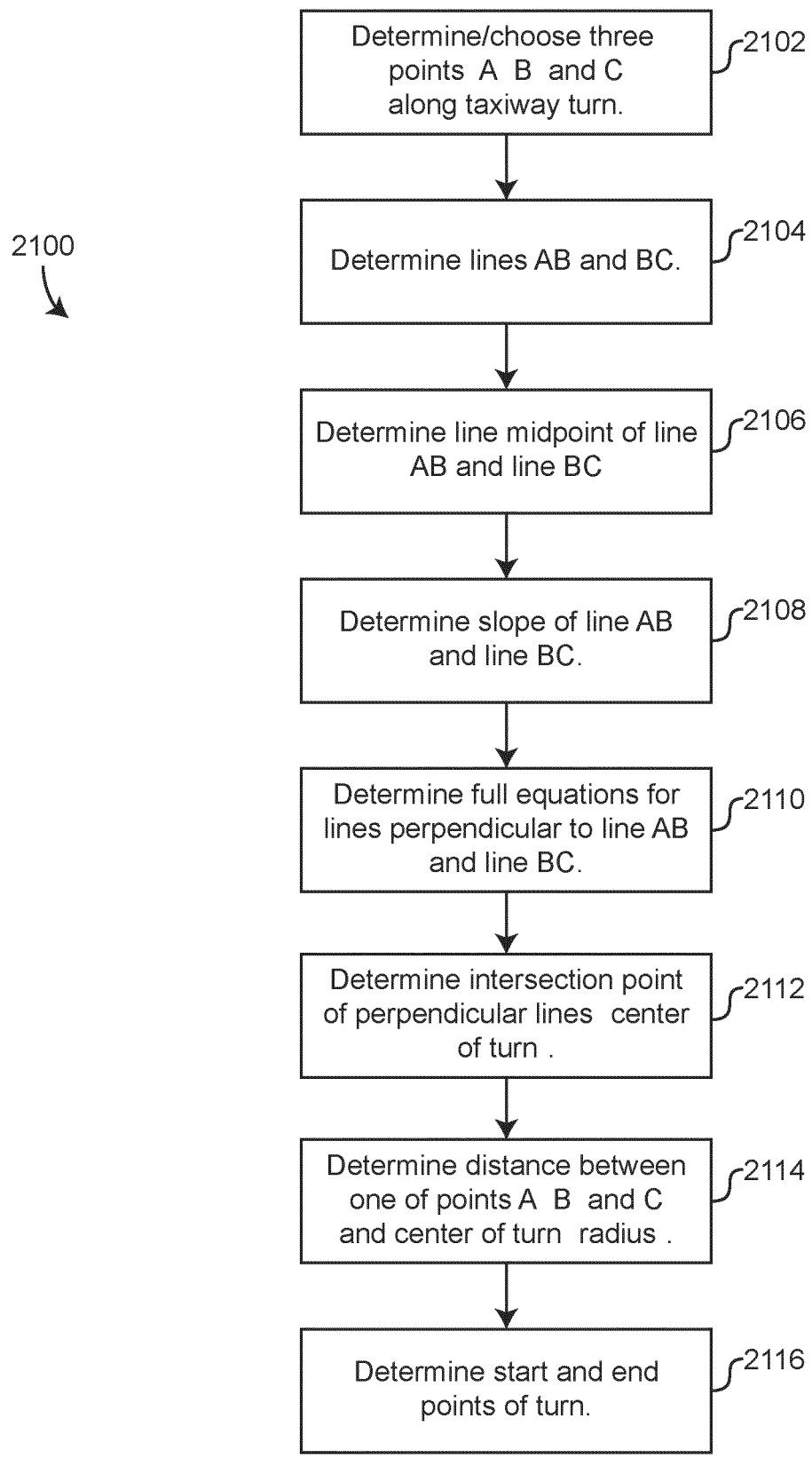
FIG. 21 is a block diagram of a method for determining start points, end points, and a center point of a turn, according to some embodiments.

Referring to FIG. 21, a process 2100 of pre-processing program is shown, according to some embodiments. Process 2100 includes steps 2102-2116, according to some embodiments. In some embodiments, process 2100 receives airport map data from any of an FAA and an ARINC database. Process 2100 includes determining/choosing three points along each taxiway turn from the airport map data (step 2102), according to some embodiments. In some embodiments, the three points are point A, point B, and point C, described in greater detail above. Process 2100 includes determining lines between adjacent/neighboring of the three determined/selected points (step 2104), according to some embodiments. In some embodiments, the determined lines are line AB and line BC, described in greater detail above. Process 2100 includes determining a midpoint of each of line AB and line BC (step 2106), according to some embodiments. In some embodiments, the midpoint of each of line AB and line BC is determined/calculated as described in greater detail above. Process 2100 includes determining a slope of each of line AB and line BC (step 2108), according to some embodiments. In some embodiments, the slope of each of line AB and line BC is determined as described in greater detail above. Process 2100 includes determining full equations for lines perpendicular to line AB and line BC (step 2110), according to some embodiments. In some embodiments, the full equations of the lines perpendicular to line AB and line BC extends through a center of turn and are determined as described in greater detail above. Process 2100 includes determining an intersection point of the perpendicular lines which is the center of turn (step 2112), according to some embodiments. In some embodiments, the intersection point is determined by setting the full equations equal to each other (as described in greater detail above). Process 2100 includes determining a distance (e.g., a Euclidean distance) between one of points A, B, and C and the center of turn (step 2114), according to some embodiments. In some embodiments, the distance between any of points A, B, and C and the center of turn is the turn radius. Process 2100 also includes determining start and end points of turn (step 2116), according to some embodiments. In some embodiments, the start and end points of the turn are determined based on the turn radius, the center of the turn, and lines extending through straight portions of the taxiway before and after the turn. In some embodiments, the start and end points of the turn are determined as described in greater detail above.

Onboard Aircraft Use

Figure 10:
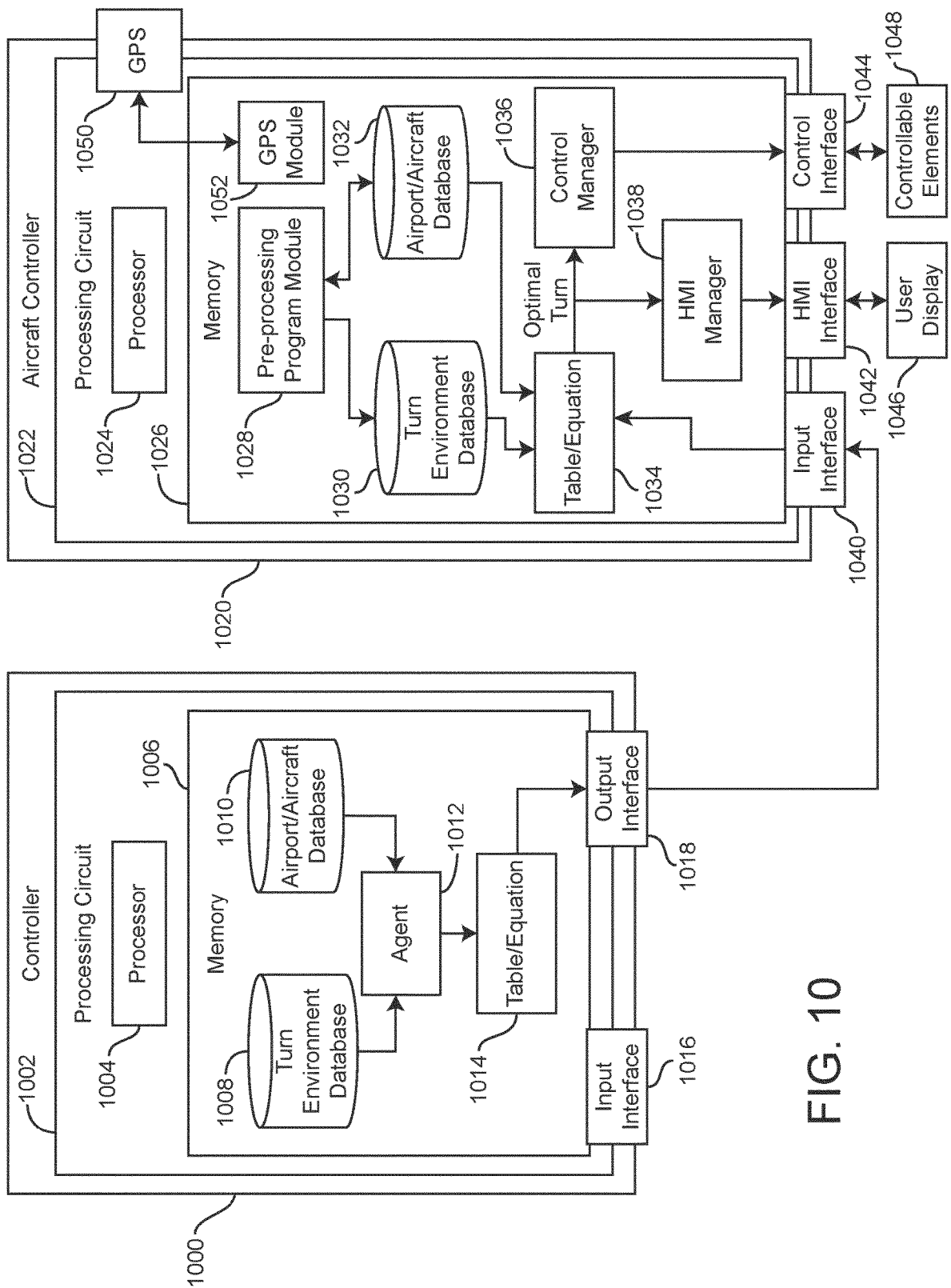
FIG. 10 is a block diagram of a controller including a learning agent, and an aircraft controller, according to some embodiments.

Referring now to FIGS. 9-10, an example of on-board implementation of the agent described herein is shown, according to some embodiments. In some embodiments, the agent is trained off-line from the aircraft. In some embodiments, the agent outputs the determined model in the form of an equation and/or a table, which is used to determine at least one of tiller angle, and nose wheel displacement based on environmental conditions (e.g. a taxiway having a certain turn radius and width) which the aircraft encounters.

Referring to FIG. 9, a system 900 is shown, according to some embodiments. System 900 is shown to include a controller 902, and an aircraft 904, according to some embodiments. In some embodiments, aircraft 904 is aircraft 110. Controller 902 is shown to include turn environment database 906, airport/aircraft database 908, agent 910, and algorithm 912, according to some embodiments. Controller 902 is configured to use agent 910 to determine algorithm 912 which aircraft 904 uses to perform an optimal turn, according to some embodiments. In some embodiments, agent 910 is configured to perform reinforcement algorithm as described in greater detail above with reference to FIGS. 1-8d. Agent 910 is shown receiving information from turn environment database 906 and airport/aircraft database 908, according to some embodiments. In some embodiments, agent 910 receives any of turn radii, a width, one or more center of curvatures, taxiway layout, airport taxiway maps, airport information, etc., or any other information relating to a taxiway and/or turn of a taxiway. In some embodiments, agent 910 receives relevant taxiway and/or taxiway turn information required to perform the reinforcement learning from turn environment database 906. Agent 910 is also shown receiving airport and aircraft data from airport/aircraft database 908, according to some embodiments. In some embodiments, the data received by agent 910 from airport/aircraft database 908 is any of information regarding the aircraft 904 (e.g., distance between a front landing gear and rear landing gear of aircraft 904, maximum tiller angle, minimum possible turn radius of aircraft 904, distance between rear landing gears, etc.), or information regarding the airport (e.g., taxiway maps, taxiway layouts, runway layouts, taxiway turn radius, taxiway width, etc.) at which aircraft 904 is landing.

Agent 910 receives any of the data from environmental database 906 and airport/aircraft database 908 and performs reinforcement learning to determine optimal operations of aircraft 904 to complete various turns along a taxiway, given various dimensions of the taxiway, according to some embodiments. Agent 910 performs the reinforcement learning algorithm and outputs at least one of a table and an equation to algorithm 912, according to some embodiments. In some embodiments, the equation output by agent 910 is an equation relating one or more independent variables (e.g., radii of curvature of a taxiway, turn width, turn angle, aircraft 904 specific information, etc.) to determine one or more dependent variables (e.g., speed of aircraft 904, tiller angle of aircraft 904, turn radius of aircraft 904, etc.) which can be controlled by aircraft 904 to perform an optimal turn. In some embodiments, the equation is a multi-variable input and a multi-variable output equation. In some embodiments, agent 910 outputs a lookup table corresponding to the equation as described herein. Advantageously, a table and/or an equation require relatively little memory to be stored in a computer, resulting in the table and/or the equation being easily stored and easily used to determine operation of one or more aircraft 904 operations to perform the turn, according to some embodiments.

Referring still to FIG. 9, aircraft 904 is shown to include an environmental database 914, according to some embodiments. In some embodiments, environmental database 914 provides the independent variables (e.g., radii of curvature, turn width, turn angle, etc.) to algorithm 912 (e.g., at least one of the table and the equation output by agent 910). Algorithm 912 uses the independent variables to determine dependent (e.g., output) variables which represent an optimal turn operation (or instructions to control landing gear of aircraft 904 to achieve the optimal turn operation), according to some embodiments. In some embodiments, aircraft 904 uses the output variables to perform actions to complete the optimal turn operation by adjusting an operation and/or configuration of a tiller (e.g., changing a tiller angle), and a nose wheel (e.g., changing a nose wheel displacement).

In some embodiments, controller 902 is positioned on aircraft 904. For example, controller 902 is integrated into the computer system of aircraft 904, according to some embodiments. In some embodiments, controller 902 continues receiving information from aircraft 904 to continually improve agent 910. In some embodiments, controller is not a part of aircraft 904 (e.g., is at a remote position relative to aircraft 904) and provides at least one of the table and the equation output by agent 910 to aircraft 904. For example, aircraft 904 wirelessly connects to a remote server and be supplied with at least one of the table and the equation to determine the optimal turn operation, according to some embodiments.

Referring now to FIG. 10, a controller 1000 is shown providing an aircraft controller 1020 with an algorithm, according to some embodiments. In some embodiments, the algorithm provided to aircraft controller 1020 is algorithm 912. In some embodiments, controller 1000 is configured to perform any of the Q-Learning reinforcement learning techniques to train agent 1012 to determine a table/equation 1014. In some embodiments, table/equation 1014 is algorithm 912 and is provided to aircraft controller 1020. In some embodiments, table/equation 1014 is representative of the state space determined by agent 1012. In some embodiments, agent 1012 is a machine learning agent which performs any of the machine learning, Q-Learning, reinforcement learning, generating a learning environment, making appropriate assumptions, validating and verifying the environment and/or results, performing geometric theory to generate the learning environment, distance and reward calculations, outputting graphs, etc., as described herein. In some embodiments, agent 1012 uses any of a turn environment provided by turn environment database 1008 and airport/aircraft data provided by airport/aircraft database 1010.

Controller 1000 is shown to include a processing circuit 1002 having a processor 1004 and memory 1006. Processor 1004 can be a general purpose or specific purpose processor, an application specific integrated circuit (ASIC), one or more field programmable gate arrays (FPGAs), a group of processing components, or other suitable processing components. Processor 1004 is configured to execute computer code or instructions stored in memory 1006 or received from other computer readable media (e.g., CDROM, network storage, a remote server, etc.).

Memory 1006 can include one or more devices (e.g., memory units, memory devices, storage devices, etc.) for storing data and/or computer code for completing and/or facilitating the various processes described in the present disclosure. Memory 1006 can include random access memory (RAM), read-only memory (ROM), hard drive storage, temporary storage, non-volatile memory, flash memory, optical memory, or any other suitable memory for storing software objects and/or computer instructions. Memory 1006 can include database components, object code components, script components, or any other type of information structure for supporting the various activities and information structures described in the present disclosure. Memory 1006 can be communicably connected to processor 1004 via processing circuit 1002 and can include computer code for executing (e.g., by processor 1004) one or more processes described herein. When processor 1004 executes instructions stored in memory 1006, processor 1004 generally configures controller 1000 (and more particularly processing circuit 1002) to complete such activities.

Controller 1000 is shown to include an input interface 1016 and an output interface 1018, according to some embodiments. Any of input interface 1016 and output interface 1018 are configured to facilitate communications between controller 1000 and external applications (e.g., databases, aircraft controller 1020, etc.), according to some embodiments.

Input interface 1016 and output interface 1018 can be or include wired or wireless communications interfaces (e.g., jacks, antennas, transmitters, receivers, transceivers, wire terminals, etc.) for conducting data communications with aircraft controller 1020, various databases and networks, according to some embodiments. In some embodiments, communications via input interface 1016 and output interface 1018 can be direct (e.g., local wired or wireless communications) or via a communications network (e.g., a WAN, the Internet, a cellular network, etc.). For example, input interface 1016 and output interface 1018 can include an Ethernet card and port for sending and receiving data via an Ethernet-based communications link or network. In another example, interfaces 1016 and 1018 can include a WiFi transceiver for communicating via a wireless communications network. In another example, one or both of interfaces 1016 and 1018 can include cellular or mobile phone communications transceivers. In some embodiments, input interface 1016 and output interface 1018 are Universal Serial Bus interfaces.

Referring still to FIG. 10, an aircraft controller 1020 is shown, according to some embodiments. Aircraft controller 1020 is shown to include a processing circuit 1022 having a processor 1024 and memory 1026. Processor 1024 can be a general purpose or specific purpose processor, an application specific integrated circuit (ASIC), one or more field programmable gate arrays (FPGAs), a group of processing components, or other suitable processing components. Processor 1024 is configured to execute computer code or instructions stored in memory 1026 or received from other computer readable media (e.g., CDROM, network storage, a remote server, etc.).

Memory 1026 can include one or more devices (e.g., memory units, memory devices, storage devices, etc.) for storing data and/or computer code for completing and/or facilitating the various processes described in the present disclosure. Memory 1026 can include random access memory (RAM), read-only memory (ROM), hard drive storage, temporary storage, non-volatile memory, flash memory, optical memory, or any other suitable memory for storing software objects and/or computer instructions. Memory 1026 can include database components, object code components, script components, or any other type of information structure for supporting the various activities and information structures described in the present disclosure. Memory 1026 can be communicably connected to processor 1024 via processing circuit 1022 and can include computer code for executing (e.g., by processor 1024) one or more processes described herein. When processor 1024 executes instructions stored in memory 1026, processor 1024 generally configures controller 1000 (and more particularly processing circuit 1022) to complete such activities.

Aircraft controller 1020 is shown to include an input interface 1040, an Human Machine Interface (HMI) 1042, and a control interface 1044, according to some embodiments. Any of input interface 1040, HMI interface 1042, and control interface 1044 are configured to facilitate communications between aircraft controller 1020 and external applications (e.g., databases, controller 1000, controllable elements 1048, aircraft control systems, sensors, aircraft equipment, etc.), according to some embodiments.

Input interface 1040, HMI interface 1042, and control interface 1044 can be or include wired or wireless communications interfaces (e.g., jacks, antennas, transmitters, receivers, transceivers, wire terminals, etc.) for conducting data communications with aircraft controller 1020, various databases, controllable elements 1048, user display 1046, various aircraft equipment, aircraft control systems, sensors, networks, etc., according to some embodiments. In some embodiments, communications via input interface 1040, HMI interface 1042, and control interface 1044 can be direct (e.g., local wired or wireless communications) or via a communications network (e.g., a WAN, the Internet, a cellular network, etc.). For example, input interface 1040, HMI interface 1042, and control interface 1044 can include an Ethernet card and port for sending and receiving data via an Ethernet-based communications link or network. In another example, input interface 1040, HMI interface 1042, and control interface 1044 can include a WiFi transceiver for communicating via a wireless communications network. In another example, one or some or all of input interface 1040, HMI interface 1042, and control interface 1044 can include cellular or mobile phone communications transceivers. In some embodiments, input interface 1040, HMI interface 1042, and control interface 1044 are Universal Serial Bus interfaces.

Referring still to FIG. 10, aircraft controller 1020 is shown to include a pre-processing program module 1028, communicably connected to turn environment database 1030 and airport/aircraft database 1032, according to some embodiments. In some embodiments, pre-processing program module 1028 receives database information through input interface 1040. For example, pre-processing program module 1028 may receive airport maps from an airport map database, according to some embodiments. In some embodiments, pre-processing program module is configured to perform the pre-processing program to determine various input parameters for table/equation 1034 as described in greater detail above with reference to FIGS. 14-18. In some embodiments pre-processing program module 1028 is configured to determine any of a radius of curvature of various turns along a taxi path of a specific airport, beginning and ending turning points, centers of curvature of various turns along the taxi path of the specific airport, etc. In some embodiments, pre-processing program module 1028 outputs any turn environment relevant information to turn environment database 1030 (e.g., beginning and ending turn points, etc.). In some embodiments, pre-processing program module 1028 receives airport/aircraft information from airport/aircraft database 1032 (e.g., airport maps, etc.). In some embodiments pre-processing program module 1028 receives airport/aircraft information from an external server/database/network through input interface 1040. In some embodiments, pre-processing program module 1028 receives the information through input interface 1040 and stores the information in airport/aircraft database 1032.

In some embodiments, pre-processing program module 1028 receives a taxi path of the aircraft through input interface 1040. For example, if ATC tells the pilot to take a particular taxi path, pre-processing program module 1028 may receive the path from either ATC and/or the pilot through input interface 1040, according to some embodiments. In some embodiments, the taxi path is wirelessly provided to aircraft controller 1020 by ATC and is received through input interface 1040 and provided to pre-processing program module 1028.

Referring still to FIG. 10, aircraft controller 1020 is shown to include turn environment database 1030 and airport/aircraft database 1032, according to some embodiments. In some embodiments, airport/aircraft database 1032 is airport/aircraft database 1010 and turn environment database 1030 is turn environment database 1008. In some embodiments, airport/aircraft database 1032 stores information regarding multiple airports and aircraft and pre-processing program module 1028 retrieves specific information relevant to the aircraft and/or the airport at which the aircraft is landing. In some embodiments, turn environment database 1030 supplies table/equation 1034 with airport and aircraft specific information as inputs to the table/equation so that the optimal turn operation can be determined. For example, if the aircraft is landing at O'Hare airport in Chicago, and it is determined (either received from ATC or manually input by the pilot) that the aircraft should taxi off of runway 5, along taxiway G and along taxiway H, pre-processing program module 1028 may retrieve an airport map for O'Hare airport, determine specific turn parameters (e.g., turns, turn angles, turn start and end points, etc.) and provide the specific turn parameters to at least one of turn environment database 1030 and table/equation 1034, according to some embodiments.

Referring still to FIG. 10, table/equation 1034 is shown receiving taxiway path specific turn information from turn environment database 1030 (and/or from pre-processing program module 1028) and determining and outputting optimal turn data, according to some embodiments. In some embodiments, the output optimal turn data is information regarding an optimal path for each required turn of the taxiway path, and/or an operation of a tiller, and a nose wheel to achieve the optimal turn. In some embodiments, table/equation 1034 provides the optimal turn data to at least one of control manager 1036 and HMI manager 1038.

In some embodiments, aircraft controller 1020 includes a GPS transceiver 1050. GPS transceiver 1050 may track a real-time location of the aircraft, according to some embodiments. In some embodiments, GPS module 1052 controls the operation of GPS transceiver 1050. In some embodiments, GPS module 1052 receives the real time location of the aircraft (e.g., latitude longitude, etc.), and provides the real time location of the aircraft to any of pre-processing program module 1028, control manager 1036, and HMI manager 1038.

In some embodiments, HMI manager 1038 receives the optimal turn data and provides guidance to the pilot via user display 1046. In some embodiments, HMI manager 1038 controls an operation of user display 1046 and provides various parameters/characteristics of the optimal turn to the pilot (e.g., at what point in the turn the tiller angle should be adjusted, an angle the tiller should be adjusted to, how long the tiller should be maintained at the angle, an initial tiller angle at the beginning of the turn, etc.). In some embodiments, HMI manager 1038 provides instructions to the pilot through user display 1046 of how to perform the optimal turn.

In some embodiments, HMI manager 1038 receives real-time location data of the aircraft from GPS module 1052. HMI manager 1038 may determine at what point along the turn the aircraft is (e.g., at a starting point of the turn, 10% into the turn, 50% into the turn, etc.) and provide the pilot oversteer instructions based on the real-time location of the aircraft.

Referring still to FIG. 10, aircraft controller 1020 is shown to include control manager 1036, according to some embodiments. In some embodiments, control manager 1036 receives optimal turn data from table/equation 1034 and determines control signals to send to controllable elements 1048 to perform the optimal turn. In some embodiments, controllable elements 1048 are any of a tiller, rudder pedals, a front landing gear, a front wheel, etc., or any other component of the aircraft which may be used to steer the aircraft during various taxiing operations. In some embodiments, control manager 1036 receives real-time location data from GPS module 1052 to determine when to initiate the optimal turn. For example, GPS module 1052 may track the real-time location of the aircraft and when the aircraft reaches a point where a turn begins, control manager 1036 initiates the turn, according to some embodiments. In some embodiments, control manager 1036 continually receives feedback from GPS module 1052 throughout the turn (or throughout the entire taxiing process). In some embodiments, control manager 1036 uses GPS location data from GPS module 1052 to determine when to initiate the turn, and then completes the turn without using additional GPS location data throughout the turn. In some embodiments, control manager 1036 receives the optimal turn from table/equation 1034 and uses GPS location data as feedback to perform any closed loop control algorithms (e.g., PI control, PID control, etc.) to generate control signals for controllable elements 1048 to achieve the optimal turn.

In some embodiments, controller 1000 receives feedback from sensors (e.g., GPS 1050, controllable elements 1048, aircraft system information, a tiller angle sensor, a gyroscope, a speed sensor, etc.), and continues learning from the turn performed by the aircraft. In some embodiments, controller 1000 receives the feedback and provides the feedback to agent 1012. Agent 1012 uses the feedback to determine rewards for the turn performed by the aircraft (e.g., as controlled by a pilot) and continues to perform reinforcement learning to determine the Q-Matrix.

In some embodiments, controller 1000 and aircraft controller 1020 are separate controllers, as shown in FIG. 10. In some embodiments, the functionality of each of controller 1000 and aircraft controller 1020 are combined to form a combined controller. In some embodiments, controller 1000 is on board the aircraft, while in some embodiments, controller 1000 is off-board the aircraft and provides the table/equation to the aircraft controller 1020 remotely (e.g., wirelessly). In some embodiments, the table/equation is/are determined offline and are loaded as part of onboard software of the aircraft. In some embodiments, the table/equation are loaded as part of the aircraft controller 1022.

Figure 19:
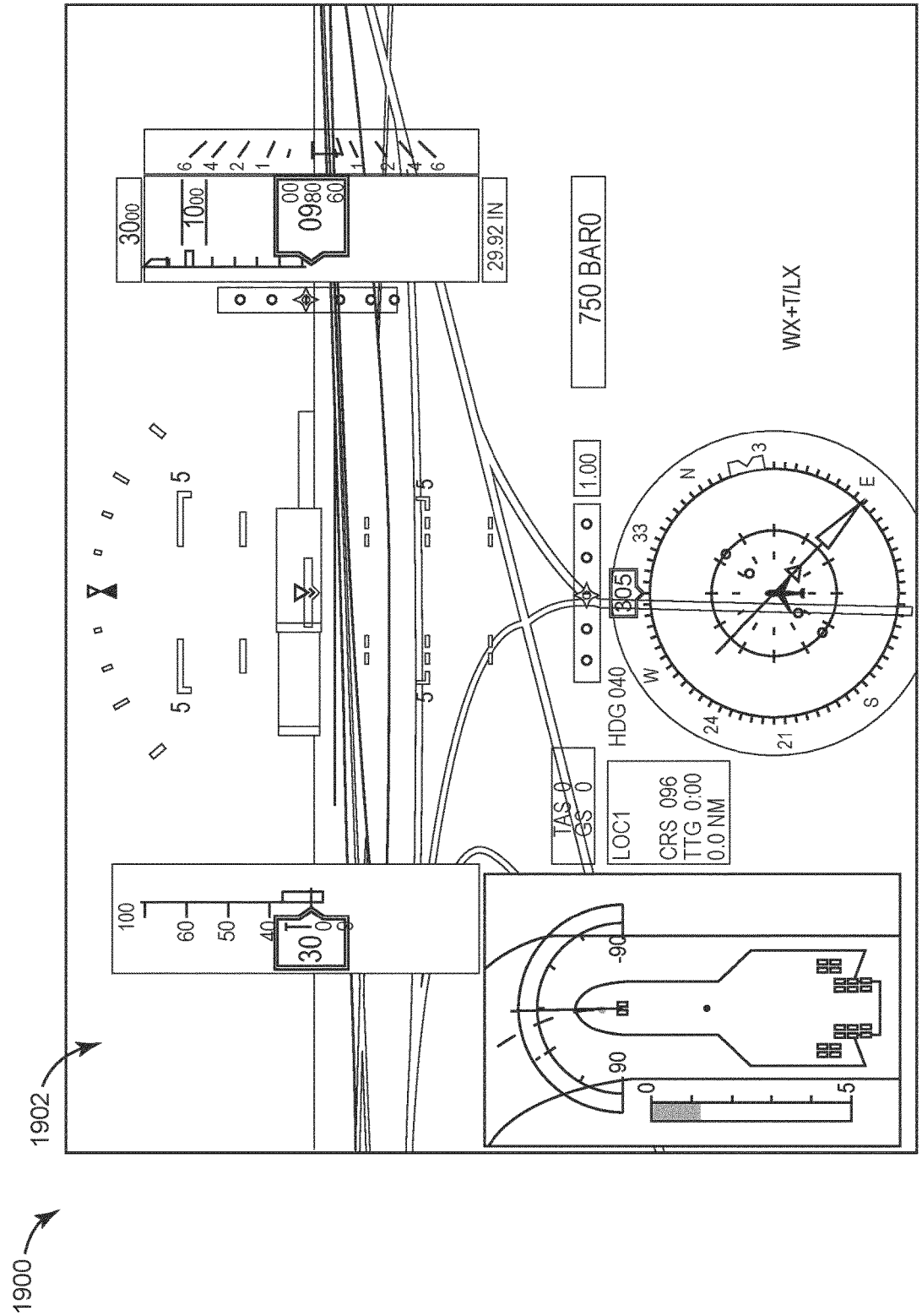
FIG. 19 is an illustration showing a Human Machine Interface to provide turn guidance to a pilot of an aircraft, according to some embodiments.
Figure 20:
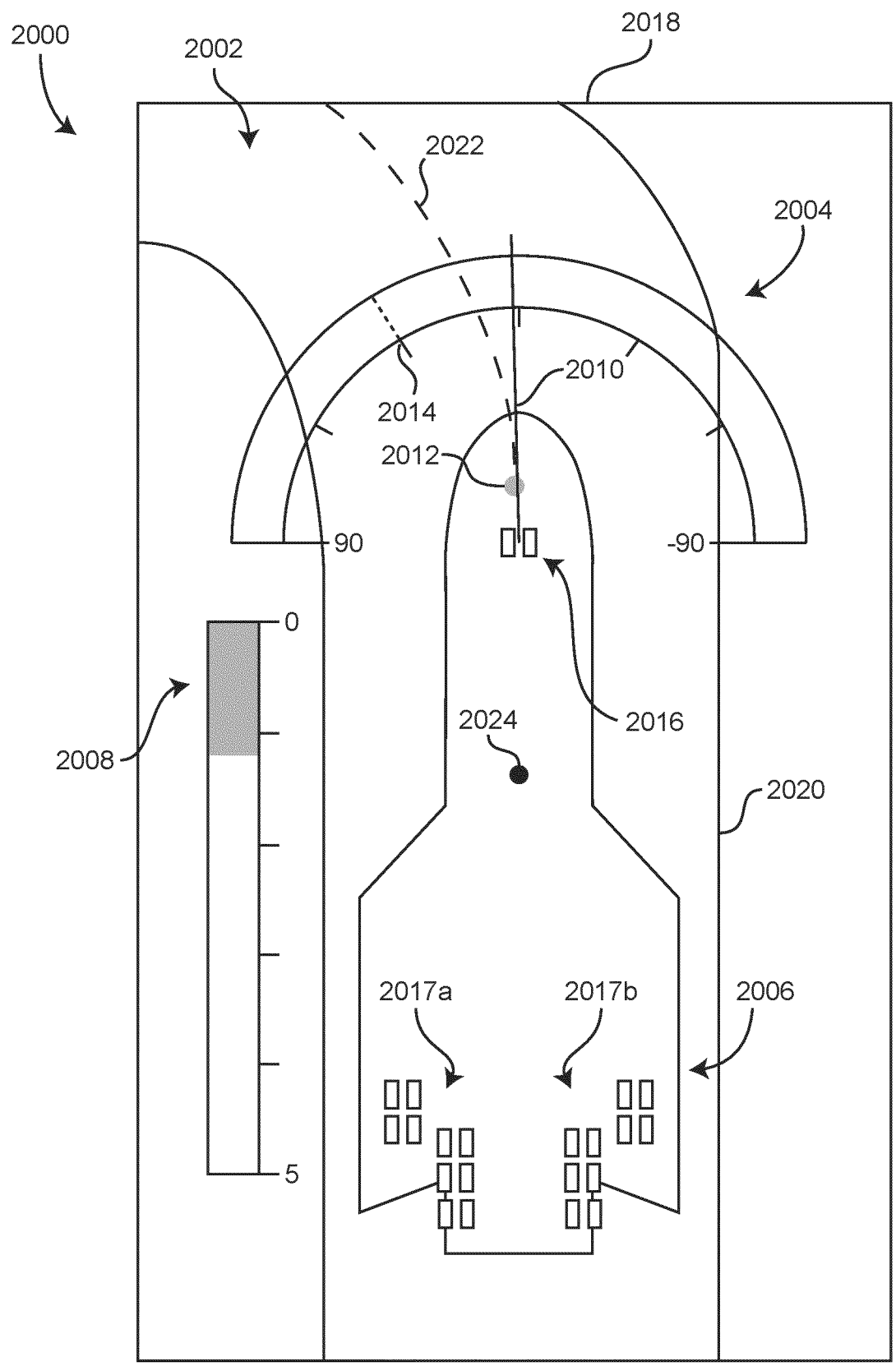
FIG. 20 is an illustration showing a Human Machine Interface to provide turn guidance to a pilot of an aircraft, according to some embodiments.

Referring now to FIGS. 19-20, an HMI 1900 is shown, according to some embodiments. In some embodiments, HMI 1900 includes a graphical representation 1902 of the airport. In some embodiments, graphical representation 1902 of the airport includes one or more paths 1904 to display any of centerlines of the taxiways of the airport, a path to take, an optimal turn path, etc. In some embodiments, graphical representation 1902 is an augmented reality HMI. In some embodiments, graphical representation 1902 is a synthetic vision system (SVS) representing a 3-dimensional view of airport surfaces and structures.

Referring to FIG. 20, a graphical display 2000 of an HMI system (e.g., HMI 1900) is shown, according to some embodiments. In some embodiments, graphical display 2000 includes a graphical display of an area 2018 of airport map 2002 surrounding aircraft 2006. In some embodiments, area 2018 shows a taxiway 2020 which aircraft 2006 is travelling along. In some embodiments, graphical display 2000 also displays (e.g., superimposes) an optimal path 2022 along a turn/curve of taxiway 2020. In some embodiments, graphical display 2000 includes a tiller angle indicator 2004. In some embodiments, tiller angle indicator 2004 displays a present angle 2010 of the tiller of aircraft 2006. In some embodiments, tiller angle indicator 2004 ranges from +90 degrees to −90 degrees. In some embodiments, tiller angle indicator 2004 includes an optimal tiller angle 2014 to complete the turn along optimal path 2022. In some embodiments, graphical display 2000 refreshes to display present information (e.g., present location of aircraft 2006, present tiller angle 2010, etc.).

Referring still to FIG. 20, graphical display 2000 is shown to include an indication point 2012 which indicates a point to begin the optimal turn (e.g., a point at which the tiller should be turned to the optimal tiller angle 2014), according to some embodiments. In some embodiments, indication point 2012 is the beginning point of the turn as determined by the pre-processing program. In some embodiments, indication point 2012 corresponds to front landing gear 2016 and when front landing gear 2016 is approximately at indication point 2012, the tiller should be adjusted to optimal tiller angle 2014. In some embodiments, indication point 2012 corresponds to center 2024 of aircraft 2006, and when center 2024 of aircraft 2006 is approximately at indication point 2012, the tiller should be adjusted to optimal tiller angle 2014.

In some embodiments, graphical display 2000 includes rear landing gear 2017. In some embodiments, providing a graphical display of rear landing gear 2017 to the pilot enables the pilot to easily determine if rear landing gear 2017 is dangerously close to an edge of the taxiway or if rear landing gear 2017 travels off of the taxiway.

In some embodiments, graphical display 2000 includes an indicator 2008 of when to adjust the tiller to optimal tiller angle 2014. In some embodiments, indicator 2008 illustrates an amount of time until the tiller should be adjusted to optimal tiller angle 2014. In some embodiments, indicator 2008 illustrates a distance until the tiller should be adjusted to optimal tiller angle 2014. In some embodiments, indicator 2008 has a range of values, and incrementally decreases (e.g., the amount of time until tiller adjustment decreases, or the distance until tiller adjustment decreases), allowing the pilot adequate time to prepare for the turn and perform the turn appropriately.

In some embodiments, graphical display 2000 includes an ending indication point (not shown) similar to indication point 2012 which tells the pilot when to adjust the tiller back to a neutral (e.g., a 0-degree position) position or a final tiller angle. In some embodiments, indicator 2008 indicates a remaining amount of time to maintain the tiller at optimal tiller angle 2014 while the turn is being performed. In some embodiments, indicator 2008 indicates any of a remaining distance between a current position of aircraft 2006 and the ending indication point and a time remaining until aircraft 2006 reaches the ending indication point.

Additional Considerations

In some embodiments, any of controller 1000 and aircraft controller 1020 additionally are configured to receive data from one or more cameras. In some embodiments, any of controller 1000 and aircraft controller 1020 are configured to perform an obstacle-detection process based on the received data from the one or more cameras. In some embodiments, any of controller 1000 and aircraft controller 1020 are configured to interface with or include an automated control system, configured to automatically control an operation of the aircraft to produce the optimal turn as determined by either of controller 1000 and aircraft controller 1020. In some embodiments, any of controller 1000 and aircraft controller 1020 are sub-components or an overall autonomous taxi solution which may include computer vision and/or additional sensors for the purpose of database alignment with the real world, position accuracy engagement, and obstacle detection and avoidance.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An oversteer system for an aircraft, the system comprising:
    a controller configured to determine a turn path along a taxiway, the controller configured to:
        receive information regarding at least one of an airport, an aircraft, and a turn environment;
        determine a learning environment based on any of the received information;
        perform a reinforcement learning algorithm using the determined learning environment to determine a model which predicts the turn path; and
        output the model as at least one of a table and an equation; and
    an aircraft controller configured to:
        receive at least one of the table and the equation from the controller;
        input path-specific information to at least one of the table and the equation;
        determine the turn path for the aircraft; and
        at least one of provide guidance to a user to complete a turn along the turn path and generate control signals to cause the aircraft to travel along the turn path.

2. The system of claim 1, wherein the controller is configured to receive information regarding at least one of the airport, the aircraft, and the turn environment from a database.

3. The system of claim 1, wherein the reinforcement learning algorithm comprises a Q-Learning technique.

4. The system of claim 1, wherein at least one of the controller and the aircraft controller is configured to determine at least one of a center, a radius, a start point, and an end point of the turn.

5. The system of claim 1, wherein the aircraft controller is configured to receive an airport map from an airport database to determine at least one of the center, the radius, the start point, and the end point of the turn.

6. The system of claim 1, wherein the aircraft controller is configured to use at least one of the table and the equation to determine a nose wheel angle and a nose wheel displacement to complete the turn based on at least one of a turn radius, a taxiway width, and an angle of turn of the taxiway.

7. The system of claim 1, wherein the controller is configured to determine at least one distance between a centerline of the taxiway and at least one of a front landing gear and a rear landing gear for a selected action.

8. The system of claim 7, wherein the controller is configured to determine a reward for the selected action based on the at least one distance.

9. The system of claim 1, wherein the aircraft controller is configured to provide a nose wheel angle and a nose wheel displacement to the user to perform the turn.

10. The system of claim 9, wherein the aircraft controller is configured to provide the nose wheel angle and nose wheel displacement to the user through a user interface, wherein the user interface comprises a nose wheel angle indicator and a nose wheel displacement indicator.

11. The system of claim 1, wherein the controller is configured to receive at least one of airport, aircraft and turn environment information, determine the learning environment, and perform the reinforcement learning algorithm remotely and provide the model to the aircraft controller remotely.

12. The system of claim 1, wherein the controller is configured to receive information from at least one sensor of the aircraft to perform the reinforcement learning based on the information from the at least one sensor of the aircraft.

13. A method for oversteering an aircraft to perform a turn along a taxiway, the method comprising:
    determining a learning environment based on at least one of a taxiway width, a taxiway centerline, and a taxiway radius of curvature;
    selecting an action for an agent in the environment, wherein the agent is an aircraft having a minimum turn radius and wherein the action comprises a nose wheel displacement and a nose wheel angle;
    determining a reward for the determined environment and the selected action, wherein the reward is determined based on a distance between a path of one or more landing gear wheels and a centerline path of the taxiway;
    repeating the steps of selecting the action and determining the reward to determine a model which outputs the turn;
    using the determined model to at least one of determine control signals for an aircraft and providing guidance to a user to perform the turn along the taxiway.

14. The method of claim 13, wherein the method further comprises receiving airport data from an airport database and:

determining a turn angle of one or more turns of a route;
determining a turn radius of the one or more turns of the route; and
determining a start and end point of the one or more turns of the route.

15. The method of claim 13, further comprising outputting the determined model as at least one of a table and an equation.

16. The method of claim 15, further comprising using at least one of the table and the equation to determine a nose wheel angle and a nose wheel displacement based on at least one of a radius of curvature of a turn, a taxiway width, and an overall turn angle of the taxiway.

17. The method of claim 16, further comprising providing the nose wheel angle and the nose wheel displacement to the user.

18. The method of claim 13, further comprising determining at least one of an average reward per episode and a median reward per episode based on the determine reward.

19. The method of claim 13, further comprising using a Q-Learning technique to determine the model based on the determined learning environment and the agent.

20. A method for determining a taxiway path of an aircraft, the method comprising:
   determining a learning environment comprising a taxiway curve, a taxiway width, a taxiway centerline, and a coordinate system;
   selecting an action from a Q-Learning matrix for an agent, wherein the agent is an aircraft having a nose wheel and one or more rear wheels and the action comprises a nose wheel angle and a nose wheel displacement, wherein the nose wheel displacement is a distance between the nose wheel and a start of the taxiway curve,
   determining a reward based on the selected action for the agent and the learning environment, wherein the reward is a value based on a distance between the taxiway centerline and at least one of the nose wheel and the rear wheels;
   updating the Q-Learning matrix with the selected action and the determined reward;
   generating at least one of a table and an equation which outputs a specific nose wheel angle and a specific nose wheel displacement for a specific taxiway in response to receiving taxiway turn parameters of the specific taxiway; and
   at least one of:
      controlling an operation of a nose wheel of the aircraft to turn the specific nose wheel angle at the specific nose wheel displacement; and
      outputting guidance information to a user interface, wherein the guidance information comprises the specific nose wheel angle and the specific nose wheel displacement.

* * * * *